United States Patent
Anderson et al.

(10) Patent No.: US 7,124,797 B2
(45) Date of Patent: Oct. 24, 2006

(54) FILAMENT WINDING APPARATUS AND METHODS OF WINDING FILAMENT

(75) Inventors: Alan H. Anderson, Placentia, CA (US); Mike Glen Allman, Spanish Fork, UT (US); Larry Jed Ashton, Mapleton, UT (US); Craig Bjarnson Simpson, Mapleton, UT (US); Benko Samasoni Ta'ala, Salem, UT (US); Troy Larry White, Goshen, UT (US)

(73) Assignee: Toyota Motor Sales, USA, Inc., Torrance, CA (US)

( * ) Notice: Subject to any disclaimer, the term of this patent is extended or adjusted under 35 U.S.C. 154(b) by 128 days.

(21) Appl. No.: 10/086,685

(22) Filed: Mar. 4, 2002

(65) Prior Publication Data

US 2003/0052212 A1 Mar. 20, 2003

Related U.S. Application Data

(60) Provisional application No. 60/272,303, filed on Mar. 2, 2001.

(51) Int. Cl.
B65H 81/00 (2006.01)
B29C 53/00 (2006.01)

(52) U.S. Cl. ............... 156/425; 156/428; 156/429; 156/430; 156/431; 156/443; 156/446; 156/169; 242/430

(58) Field of Classification Search .............. 156/425, 156/428, 429, 430, 431, 433, 446, 169, 170, 156/173, 176
See application file for complete search history.

(56) References Cited

U.S. PATENT DOCUMENTS

| | | | |
|---|---|---|---|
| 2,517,902 A | | 8/1950 | Luebkeman |
| 3,616,063 A | * | 10/1971 | Bradley .............. 156/425 |
| 3,874,030 A | * | 4/1975 | Knight ............... 28/282 |
| 3,886,029 A | * | 5/1975 | Poulsen .............. 242/444 |
| 4,610,402 A | * | 9/1986 | Corbett et al. ....... 242/436 |
| 4,783,232 A | | 11/1988 | Carbone et al. |
| 4,822,444 A | | 4/1989 | Weingart et al. |
| 4,869,761 A | * | 9/1989 | Weingart et al. ..... 156/175 |
| 4,907,754 A | | 3/1990 | Vaniglia |
| 4,921,557 A | * | 5/1990 | Nakamura ........... 156/169 |
| 4,938,824 A | | 7/1990 | Youngkeit |
| 5,022,952 A | | 6/1991 | Vaniglia |
| 5,059,377 A | | 10/1991 | Ashton et al. |
| 5,223,067 A | | 6/1993 | Hamamoto et al. |
| 5,242,523 A | | 9/1993 | Willden et al. |
| 5,259,901 A | | 11/1993 | Davis et al. |
| 5,262,121 A | | 11/1993 | Goodno |
| 5,266,137 A | | 11/1993 | Hollingsworth |

(Continued)

FOREIGN PATENT DOCUMENTS

EP   0 770 472 A   5/1997

(Continued)

OTHER PUBLICATIONS

"Filament Winding", Rosato, D. and Grove, C., Intersciene Publishers, Jun. 1964.*

(Continued)

*Primary Examiner*—Justin R. Fischer
(74) *Attorney, Agent, or Firm*—Finnegan, Henderson, Farabow, Garrett & Dunner, LLP

(57) ABSTRACT

The present invention relates to apparatus and methods for winding filament to create a structure. In one embodiment, the invention includes the application of filament to a rotating mandrel to create a desired shape. The invention includes the filament winding of both simple and complex shapes.

38 Claims, 22 Drawing Sheets

U.S. PATENT DOCUMENTS

| | | | |
|---|---|---|---|
| 5,362,345 A | | 11/1994 | Stettler et al. |
| 5,571,357 A | | 11/1996 | Darrieux et al. |
| 6,082,660 A | * | 7/2000 | Meyer .................. 242/548 |
| 6,096,164 A | | 8/2000 | Benson et al. |
| 6,112,792 A | * | 9/2000 | Barr et al. .................. 156/441 |
| 6,179,945 B1 | | 1/2001 | Greenwood et al. |

FOREIGN PATENT DOCUMENTS

| | | | |
|---|---|---|---|
| EP | 0 786 330 A | | 7/1997 |
| EP | 1 005 978 A | | 6/2000 |
| FR | 2 424 470 A | | 11/1979 |
| FR | 2 664 529 | | 7/1990 |
| GB | 1 481 167 | | 7/1977 |
| GB | 2 232 954 A | | 1/1991 |
| JP | 0 4179515 A | | 6/1992 |
| JP | 5-50515 | | 3/1993 |
| JP | 05050515 | * | 3/1993 |
| WO | PCT/US98/01740 | | 7/1998 |

OTHER PUBLICATIONS

Dec. 29, 2003 Letter from Craig Metcalf of Madson & Metcalf (1 page) including Attachment 1 (8 pages).

Reference [1]—Radack, David V., "Reading and Understanding Patent Claims," http://www.tms.org/pubs/journals/JOM/matters/matters-9511.html, Sep. 29, 2003. (3 pages).

Reference [2]—"Filament Winding Composite Structure Fabrication," Society for the Advancement of Material and Process Engineering, 1991. (13 pages).

Reference [3]—Entec Composite Machines Home Page, http://www.entec.com, Dec. 19, 2003. (2 pages).

Reference [4]—McClean Anderson Home Page, http://www.mcleananderson.com, Dec. 19, 2003. (1 page).

Reference [5]—Walsh, Paul et al., "Carbon Fiber Property Translation into Composite—A Comparison of Commercial Grade 48K Carbon Fibers Versus 12K Aerospace Fibers." (16 pages).

Reference [6]—"The Mission: To Deliver Large-Tow Carbon Fiber in Filament Winding Applications." (21 pages).

Reference [7]—User Manual for Cadwind NG for Windows, 1999. (4 pages).

Reference [8]—Marchel, Oliver, "Space Qualification Program for CFRP-Prepregs Used for Design of Deployable Booms as a Main Structural Part of a Solar Sail." (12 pages).

D.V. Rosato et al., "Filament Winding: Its Development, Manufacture, Applications, and Design," John Wiley & Sons, Inc., (1964).

* cited by examiner

FILAMENT WINDING APPARATUS AND METHODS OF WINDING FILAMENT

I. CROSS-REFERENCE TO RELATED APPLICATION

This application claims the benefit of U.S. Provisional Application No. 60/272,303, filed Mar. 2, 2001, by Alan H. Anderson et al. and titled A FILAMENT WOUND CLOSED-SHAPE STRUCTURE AND METHOD OF FORMING SAME, the disclosure of which is expressly incorporated by reference.

II. BACKGROUND OF THE INVENTION

A. Field of the Invention

The present invention relates to apparatus and methods for winding filament. In particular, the present invention relates to apparatus and methods for winding filament to create a filament-wound structure.

Within the specification, the term filament winding is used to describe the process in accordance with the invention. However, winding may actually be performed using "fiber bundles" comprising multiple individual filaments or fibers. Bundles may comprise a few filaments—as few as one—to as many as several million. Bundles of filaments are also called tows or rovings depending upon the material from which the filament is made. Therefore, the terms "fiber bundle" and "filament," as used in this application, include both a single filament and bundles comprising multiple filaments.

B. Background of the Invention

In the aircraft industry, filaments are increasingly being used to form composite structures. For example, filaments are used to manufacture structures such as aircraft fuselages, aircraft empennages, and aircraft wings. In general, these filaments are lightweight and produce a smooth skin surface. This makes filaments ideal for the creation of structures with a smooth surface and low weight.

Typically, the manufacture of products using filaments includes the placement of filaments on a mandrel having a desired shape of a structure. The filaments are then cured or subjected to some other process to form the skin of the structure. In general, filament winding can be applied by a winding system or by hand. However, current apparatus and methods for manufacturing filament-wound structures have several disadvantages.

Current filament winding apparatus and methods tend to produce an uneven skin. This reduces the uniformity and smoothness of the structure. This reduced smoothness and uniformity also adversely affects the aerodynamics of the resulting structures because these problems create drag.

Current filament winding systems and methods also produce skins that are unduly thick. For example, most current winding machines cannot produce a structurally desirable skin thinner than 0.02 inches. This results in increased weight of the structure, which may hamper performance.

Some of these problems may be overcome by using hand placement. Hand placement of filaments may potentially be used to produce a thin, uniform skin. Hand placement of filaments, however, dramatically increases the costs of manufacturing these structures. Hand placed filaments are expensive to produce, and the labor costs associated with applying filaments by hand are very high.

The creation of filament winding apparatus and methods that could inexpensively produce a thin, uniform skin would therefore provide many advantages. For example, it would improve the smoothness of the structures, which would improve aerodynamics. It would also remove weight, which could improve performance. It would further be less costly to manufacture.

As for smoothness and uniformity, filament winding apparatus and methods that could produce a uniform skin on both simple and complex structures would improve the overall smoothness of the structure. If the skin is uneven, this reduces the overall smoothness of the structure. For aircraft structures, this can be a serious disadvantage. Therefore, apparatus and methods capable of winding a uniform skin on simple and complex structures would improve smoothness.

As for weight, a filament winding apparatus that could produce very thin skins would use less material. The use of less material results in lower weight. For example, most current systems cannot use a gauge tow lower than 5 mil (0.005 inches). Apparatus capable of winding gauge tows thinner than 5 mil would thus improve cost and weight.

As for cost, a thinner skin results in less weight, which results in less cost. Also, if hand placement can be avoided, costs would be further reduced.

Therefore, it is desirable to provide a winding apparatus capable of producing a thin, uniform, and inexpensive filament skin.

Apparatus and methods in accordance with the invention provide for a winding system capable of producing a thin, uniform, and inexpensive filament skin.

III. SUMMARY OF THE INVENTION

Apparatus and methods consistent with the present invention may provide a filament winding system capable of producing a thin, uniform filament skin.

An apparatus consistent with the present invention provides a filament winding apparatus for winding a fiber bundle onto a structure. The apparatus comprises a fiber bundle application section. The fiber bundle application section further comprises a spool section comprising at least one fiber bundle spool and a winding head comprising a spreading assembly. The apparatus also comprises a transport to move the fiber bundle application section and a controller for applying the fiber bundle on the structure.

Another apparatus consistent with the present invention provides a filament winding apparatus for winding a fiber bundle onto a structure, wherein the structure is supported by a mandrel. This apparatus comprises a fiber bundle application section. The fiber bundle application section further comprises a spool section, an articulator to rotate the spool section, and a winding head comprising a spreading assembly. The spool section further comprises at least one fiber bundle spool and an idler rod to control the tension in the fiber bundle. The apparatus also comprises a resin applicator to apply resin to the fiber bundle, a transport to move the fiber bundle application section, and a controller for applying the fiber bundle on the structure.

Another apparatus consistent with the present invention provides an articulating winding head. The winding head comprises a frame having a top and bottom, a plurality of spaced apart winding eyes disposed adjacent the top of the frame, a plurality of rods arranged within the frame, and a roller disposed adjacent the bottom of the frame. The winding eyes, rods, and roller are arranged to spread a plurality of fiber bundles entering the winding head and to arrange the spread fiber bundles in side-by-side parallel manner for application to an object to be wound with fiber bundles.

A method consistent with the present invention provides a method of filament winding a closed-shape structure. The method comprises providing a mandrel on which a fiber bundle can be wound, providing at least one spool of a fiber bundle for a winding assembly configured to travel along a path substantially parallel to the axis of rotation of the mandrel, feeding a fiber bundle from the spool through a winding eye, conveying the fiber bundle through a rod assembly to spread the fiber bundle to a desired thickness, and applying the fiber bundle to the mandrel.

A system consistent with the present invention provides a system for filament winding a closed-shape structure. The system comprises a first providing component configured to provide a mandrel on which a fiber bundle can be wound, a second providing component configured to provide at least one spool of a fiber bundle for a winding assembly configured to travel along a path substantially parallel to the axis of rotation of the mandrel, a feeding component configured to feed fiber bundle from the spool through a winding eye, a conveying component configured to convey the fiber bundle through a rod assembly to spread the tow to a desired thickness, and a first applying component configured to apply the fiber bundle to the mandrel.

Another system consistent with the present invention provides a computer readable medium containing instructions for controlling a computer system to perform a method of filament winding a closed-shape structure. The method comprises providing a mandrel on which a fiber bundle can be wound, providing at least one spool of a fiber bundle for a winding assembly configured to travel along a path substantially parallel to the axis of rotation of the mandrel, feeding a fiber bundle from the spool through a winding eye, conveying the fiber bundle through a rod assembly to spread the fiber bundle to a desired thickness, and applying the fiber bundle to the mandrel.

Another system consistent with the present invention provides a system for filament winding a closed-shape structure. The system comprises first providing means for providing a mandrel on which a fiber bundle can be wound, second providing means for providing at least one spool of a fiber bundle for a winding assembly configured to travel along a path substantially parallel to the axis of rotation of the mandrel, a feeding means for feeding a fiber bundle from the spool through a winding eye, a conveying means for conveying the fiber bundle through a rod assembly to spread the fiber bundle to a desired thickness, and an applying means for applying the fiber bundle to the mandrel.

Additional aspects of the invention are disclosed and defined by the appended claims. It is to be understood that both the foregoing general description and the following detailed description are exemplary and explanatory only and are not restrictive of the invention as claimed.

IV. BRIEF DESCRIPTION OF THE DRAWINGS

The accompanying drawings, which are incorporated in and constitute a part of this specification, illustrate several embodiments of the invention and together with the following description, serve to explain the principles of the invention.

V. DESCRIPTION OF THE EMBODIMENTS

A. Introduction

Apparatus and methods in accordance with the present invention will now be described with respect to filament winding. The following examples are just some of the embodiments and implementations in accordance with the invention. Other embodiments and other implementations may also be used.

B. Systems and Methods

Figure 1:
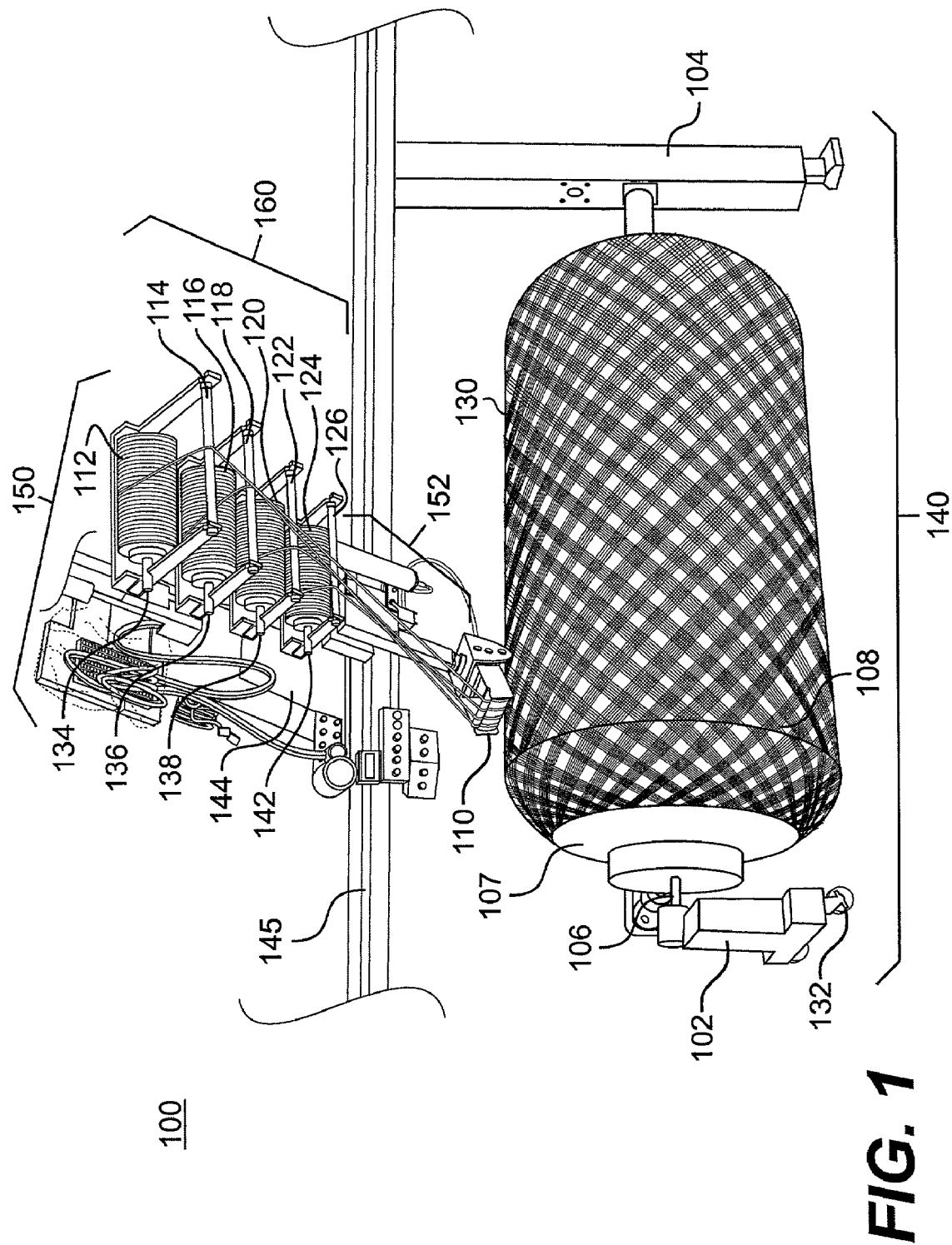
FIG. 1 is a perspective view of a filament winding system in accordance with an embodiment of the invention.

FIG. 1 is a perspective view of a filament winding system in accordance with an embodiment of the invention. As shown in FIG. 1, a filament winding system 100 applies a fiber bundle 130 to a mandrel 108. Using filament winding system 100, a structure (such as, for example an aircraft fuselage) may be created on mandrel 108. Any structure may be created on mandrel 108.

In one implementation, filament winding system 100 includes four components: a mandrel section 140, a fiber bundle application section 150, a transport 144, and a controller (not shown). In other implementations, filament winding system 100 may include other (including more or less) components.

Mandrel section 140 provides for the positioning of mandrel 108 during the winding of fiber bundle 130. Mandrel 108 establishes a shape for the structure to be formed. In one implementation, as shown in FIG. 1, mandrel 108 is a cylinder. However, mandrels of any shape can be used. For example, in one implementation, mandrel 108 has the shape of a fuselage for an aircraft. As noted above, any structure may be created on mandrel 108.

In one implementation, mandrel section 140 comprises a left frame 102, a right frame 104, and a winding shaft 106. Mandrel section 140 may also comprise other elements. In this implementation, winding shaft 106 is placed through mandrel 108. Then, winding shaft 108 is connected to left frame 102 and right frame 104 such that winding shaft 106 is capable of controlled rotation during application of fiber bundle 130 to mandrel 108.

Winding shaft 106 forms the rotational axis of mandrel 108. In one implementation, winding shaft 106 is a cylindrical metallic shaft. Other shapes and other materials may be used for winding shaft 106. Additionally, in one implementation, a numerically controlled motor (not shown) rotates winding shaft 106. These implementations are merely exemplary, and other implementations may also be used.

Left frame 102 and right frame 104 hold winding shaft 106. In one implementation, left frame 102 and right frame 104 are capable of being vertically adjusted so that winding shaft 106 can be placed higher or lower depending on the size of the mandrel. This implementation is merely exemplary, and other implementations may also be used.

In one implementation, left frame 102 and right frame 104 are also capable of being horizontally adjusted to accommodate differing sizes of winding shafts 106. For example, in one implementation, right frame 104 may remain stationary while left frame 102 has wheels 132 and may be moved to accommodate differing sizes of winding shafts 106. This implementation is merely exemplary, and other implementations may also be used.

As shown in FIG. 1, mandrel section 140 may include winding aids 107. In one implementation, mandrel 108 includes winding aids 107 at the ends of mandrel 108 to allow proper winding at the ends of mandrel 108. Obtaining a desired winding pattern at the ends of mandrel 108 may be difficult to achieve because of the immediate change in shape at the ends of mandrel 108. In this implementation, winding aids 107 comprise a hemispherical surface. Winding aids 107 may be integral with mandrel 108 or may be one or more separate pieces. Winding aids 107 may also be used on other portions of mandrel 108 where winding would be difficult. In this implementation, winding aids 107 are removed from mandrel 108 following the winding of the filament on mandrel 108. These implementations are merely exemplary, and other implementations may also be used.

Fiber bundle application section 150 applies fiber bundle 130 to mandrel 108 during winding of fiber bundle 130 on mandrel 108. As shown in FIG. 1, fiber bundle application section 150 comprises a spool section 160, an arm section 152, and a winding head 110. Arm section 152 connects spool section 160 to winding head 110. Fiber bundle application section 150 may also comprise other components.

In one implementation, spool section 160 includes fiber bundle spools 112, 116, 120, and 124, spool shafts 134, 136, 138, and 142, and idler rods 114, 118, 122, and 126. Fiber bundle spools 112, 116, 120, and 124 are placed on spool shafts 134, 136, 138, and 142, respectively. In this implementation, spool section 160 comprises four spools. These implementations are merely exemplary, and other implementations may also be used.

As shown in FIG. 1, in one implementation, fiber bundle 130 is wound from fiber bundle spools 112, 116, 120, and 124 over idler rods 114, 118, 122, and 126 and down to winding head 110. Winding head 110 applies fiber bundle 130 to mandrel 108. Spool section 160 is further described in FIGS. 2–3. Winding head 110 is further described in FIGS. 4–8. Arm section 152 is further described in FIGS. 2–3. These implementations are merely exemplary, and other implementations may also be used.

Transport 144 is a device for moving fiber bundle application section 150. In one implementation, transport 144 moves fiber bundle application section 150 relative to mandrel 108 to allow the application of fiber bundle 130 along the length of mandrel 108. In this implementation, transport 144 is connected to fiber bundle application section 150. In one implementation, transport 144 also contains a numerically controlled motor (not shown) to move the transport 144 along rail 145. These implementations are merely exemplary, and other implementations may also be used.

The controller (not shown) controls the filament winding system 100. In one implementation, the controller is a computer that controls mandrel section 140, fiber bundle application section 150, and transport 144. In this implementation, the controller controls the movement of mandrel 108, the movement of transport 144, the application of resin to fiber bundle 130, and the application of fiber bundle 130 to mandrel 108. These implementations are merely exemplary, and other implementations may also be used.

In one implementation, the controller controls the wind angle of system 100 by controlling the position of winding head 110. For example, in FIG. 1, the wind angle is plus or minus 45 degrees. Other wind angles or varying winding angles may also be used.

In another implementation, the controller maintains a fixed distance between winding head 110 and mandrel 108 to maintain a constant fiber bundle bandwidth. Maintaining a fixed distance between winding head 110 and the surface of mandrel 108 is important in controlling fiber bundle bandwidth during winding. If mandrel 108 does not have a constant diameter, then infeed and outfeed are necessary to maintain the desired fixed distance and consequently the desired fiber bundle bandwidth. Various distances may also be used resulting in various fiber bundle bandwidths. In still another implementation, the controller maintains a particular distance through numerical controls. Other implementations such as a laser or an ultrasonic system may be used. All of these implementations are merely exemplary, and other implementations may also be used.

In another implementation, the controller determines the order and location of the application of fiber bundle 130 to mandrel 108. For simple mandrel structures, such as mandrel 108 in FIG. 1, a wind angle can be determined by known methodologies, and the filament can be wound at that angle until mandrel 108 is covered with fiber bundle 130. However, for more complicated structures (such as mandrel 910 shown in FIGS. 9A–9B), other implementations may be needed. In such implementations, the controller may control the operation of mandrel section 140 and fiber bundle application section 150 in accordance with a predetermined computer model to wind fiber bundle 130 on a complex shape. Examples of computer models for the controller are described in more detail in FIGS. 10–15.

Figure 2:
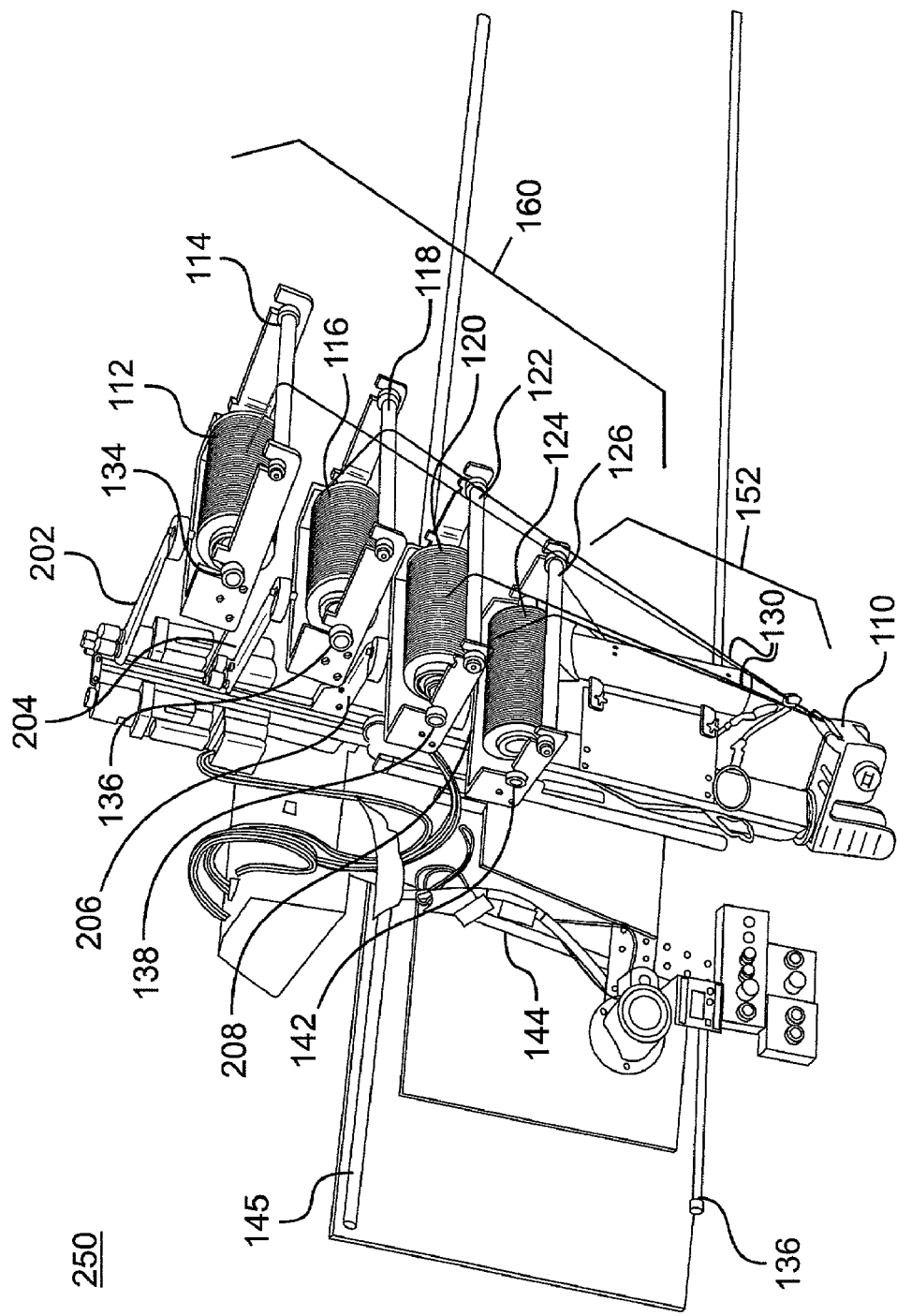
FIG. 2 is a perspective view of a fiber bundle application section of a filament winding system in accordance with an embodiment of the invention, as shown in FIG. 1.

FIG. 2 is a perspective view of a fiber bundle application section of a filament winding system in accordance with an embodiment of the invention, as shown in FIG. 1. As shown in FIG. 2, fiber bundle application section 250 includes arm section 152, spool section 160, and winding head 110, as shown in fiber bundle application section 150 in FIG. 1. As shown in FIG. 2, fiber bundle application section 250 also includes articulators 202, 204, 206, and 208. Fiber bundle application section 250 may also include other components.

Spool section 160 includes fiber bundle spools 112, 116, 120, and 124, spool shafts 134, 136, 138, and 142, and idler rods 114, 118, 122, and 126. Fiber bundle spools 112, 116, 120, and 124 include spools wound with any fiber bundle 130. In one implementation, fiber bundle 130 is a no twist fiber bundle or a previously twisted fiber bundle that has been untwisted. In another implementation, fiber bundle 130 is sized such that the individual filaments may be spread before being applied. Some of the fiber bundles that may be acceptable include: Toray T700 SC 12K 50C carbon filament, BP Amoco T-300C 12K, Fortafil 510 80K, and Hexcel AS4C 12K. These implementations and materials are merely exemplary, and other implementations and other materials may also be used.

Spool shafts 134, 136, 138, and 142 include shafts for supporting filament spools 112, 116, 120, and 124. In one implementation, filament spools 112, 116, 120, and 124 are placed on spool shafts 134, 136, 138, and 142, respectively. In this implementation, as fiber bundle 130 is fed from spools 112, 116, 120, and 124, spools 112, 116, 120, and 124 rotate around spool shafts 134, 136, 138, and 142, respectively. In one implementation, spool shafts 134, 136, 138, and 142 are preloaded under spring tension, which controls the minimum amount of tension in fiber bundle 130 during removal from spools 112, 116, 120, and 124. Some spring tension in spool shafts 134, 136, 138, and 142 may prevent unspooling when filament winding system 100 slows down. These implementations are merely exemplary, and other implementations may also be used.

Idler rods 114, 118, 122, and 126 include rods for directing fiber bundle 130. In one implementation, fiber bundle 130 is fed from spools 112, 116, 120, and 124 over idler rods 114, 118, 122, and 126 into winding head 110. In this implementation, the tension in fiber bundle 130 varies with the diameter of spools 112, 116, 120, and 124. Therefore, as more fiber bundle 130 is paid out from spools 112, 116, 120, and 124, the tension in fiber bundle 130 continuously changes. In one implementation, idler rods 114, 118, 122, and 126 also control the tension in fiber bundle 130. For example, idler rods 114, 118, 122, and 126 may keep the tension in fiber bundle 130 constant as it is fed into winding head 110. In one implementation, idler rods 114, 118, 122, and 126 rotate under control of dynamic tensioners, which control the tension in fiber bundle 130 by controlling the amount of rotational force required to turn idler rods 114, 118, 122, and 126. These implementations are merely exemplary, and other implementations may also be used.

As shown in FIG. 2, spool section 160 also includes articulators 202, 204, 206, and 208. In one implementation, articulators 202, 204, 206, and 208 are pivoting devices. In this implementation, articulators 202, 204, 206, and 208 allow spool section 160 to rotate from side to side. By allowing spool section 160 to rotate, articulators 202, 204, 206, and 208 allow fiber bundle 130 to be fed straight down into winding head 110. This implementation is merely exemplary, and other implementations may also be used.

As shown in FIG. 2, arm section 152 connects spool section 160 to winding head 110. In one implementation, the connection of spool section 160 to winding head 110 by arm section 152 enables winding head 110 to rotate relative to arm section 152. In this implementation, rotation of winding head 110 provides for the application of fiber bundle 130 at multiple angles. This implementation is merely exemplary, and other implementations may also be used.

As shown in FIG. 2, winding head 110 applies fiber bundle 130 to mandrel 108. Winding head 110 is further described in FIGS. 4–8C. As shown in FIG. 2, arm section 152, spool section 160, and winding head 110 are connected to transport 144. Transport 144 allows fiber bundle application section 250 to move relative to a mandrel (e.g., mandrel 108 in FIG. 1). In one implementation, transport 144 moves fiber bundle application section 250 along rails 145. This implementation is merely exemplary, and other implementations may also be used.

Additionally, with reference to FIG. 2, a controller (not shown) may control the movement of transport 144 and the application of fiber bundle 130. In one implementation, controller controls the rotation of winding head 110 and the infeed and outfeed of arm section 152 for application of fiber bundle 130. This implementation is merely exemplary, and other implementations may also be used.

Figure 3:
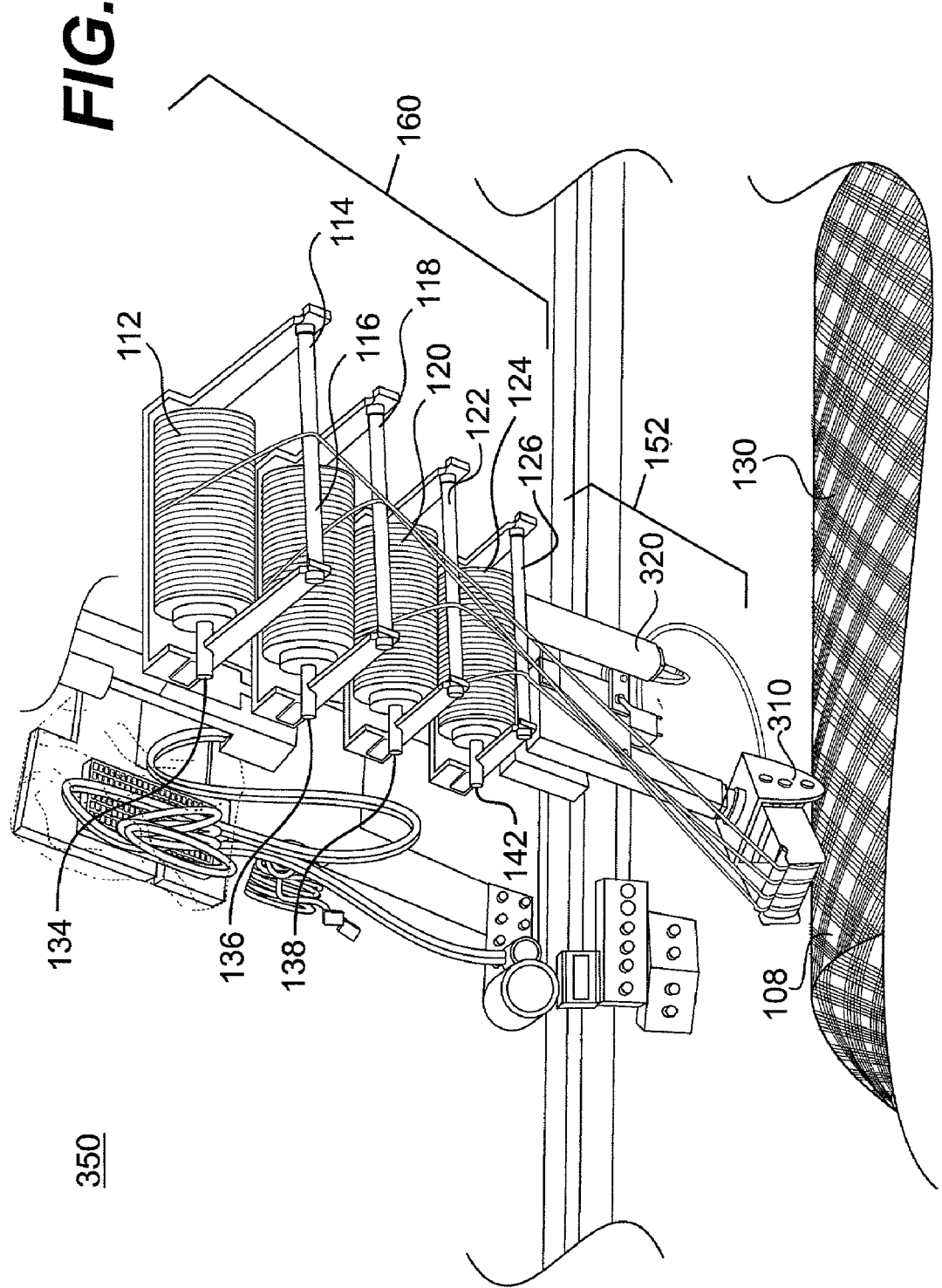
FIG. 3 is a perspective view of a fiber bundle application section of a filament winding system with an articulated winding head in accordance with an embodiment of the invention, as shown in FIG. 2.

FIG. 3 is a perspective view of a fiber bundle application section of a winding system with an articulated winding head in accordance with an embodiment of the invention, as shown in FIG. 2. As shown in FIG. 3, fiber bundle application section 350 includes a spool section 160, an arm section 152, an articulated winding head 310, and a resin container 320. Spool section 160 includes fiber bundle spools 112, 116, 120, and 124, spool shafts 134, 136, 138, and 142, and idler rods 114, 118, 122, and 126. Fiber bundle 130 comes from fiber bundle spools 112, 116, 120, and 124

(which are attached to spool shafts 134, 136, 138, and 142), passes over idler rods 114, 118, 122, and 126 into articulated winding head 310. Arm section 150 connects spool section 160 to articulated winding head 310. In this implementation, arm section 150 allows articulated winding head 310 to rotate and to control infeed and outfeed, as described in FIG. 2. This implementation is merely exemplary, and other implementations may also be used.

As shown in FIG. 3, although articulated winding head 310 has been rotated, spool section 160 has not been rotated. However, as described in FIG. 2, articulators (not shown) could be used to rotate spool section 160 such that the filaments are fed straight down into articulated winding head 310. This implementation is merely exemplary, and other implementations may also be used.

As also shown in FIG. 3, articulated winding head 310 contains four fiber bundles, one from each fiber bundle spool, i.e. from fiber bundle spools 112, 116, 118, and 120. In one implementation, articulated winding head 310 winds all four fiber bundles around mandrel 108 at the same time. Articulated winding head 310 may also accommodate a different number of fiber bundles. Articulated winding head 310 (and winding head 110) is further described in FIGS. 4–8C. These implementations are merely exemplary, and other implementations may also be used.

As further shown in FIG. 3, fiber bundle application section 350 also includes a resin container 320. Resin container 320 holds resin to be applied on fiber bundle 130. In one implementation, resin container 320 may be heated. For example, resin container 320 may be heated to between 150 and 160 degrees Fahrenheit. The application of resin is further described in FIG. 6B. These implementations are merely exemplary, and other implementations may also be used.

Any type of commercially available resin system for commercial or aerospace grade pre-impregnated composite materials may be used to provide resin. In one implementation, a resin system may include both hot melts and solvent impregnation (e.g., high viscosity resin with solvent thinner). In another implementation, a single component resin (e.g., a high solid resin) may be used with heat for viscosity control. These implementations are merely exemplary, and other implementations may also be used.

Any type of supply technologies may also be used for the resin system in a filament winding system (e.g., such as filament winding system 100). In one implementation, the supply technologies include mixer and mixing technology, metering pumps, dispense valve technology, and material feed technology. This implementation is merely exemplary, and other implementations may also be used.

Any type of resin may also be used for the resin system in a filament winding system (e.g., such as filament winding system 100). In one implementation, a one-part resin may be used. In this implementation, the resin is very viscous and has high tack at room temperature. For example, in this implementation, resin viscosity at room temperature may be about 300,000 CPS. However, at 165 degrees Fahrenheit, the viscosity may be about 25,000 CPS. In another implementation, a two-component resin may be used, where the components are held at an ideal pressure feed temperature, transported to a fixed ratio metering device, statically mixed in an impingement mixer, and transported to a dispense valve at a filament impregnation location. The temperature of the two components of the resin and the temperature of the mixed resin may be controlled as necessary. These implementations are merely exemplary, and other implementations may also be used.

Figure 4:
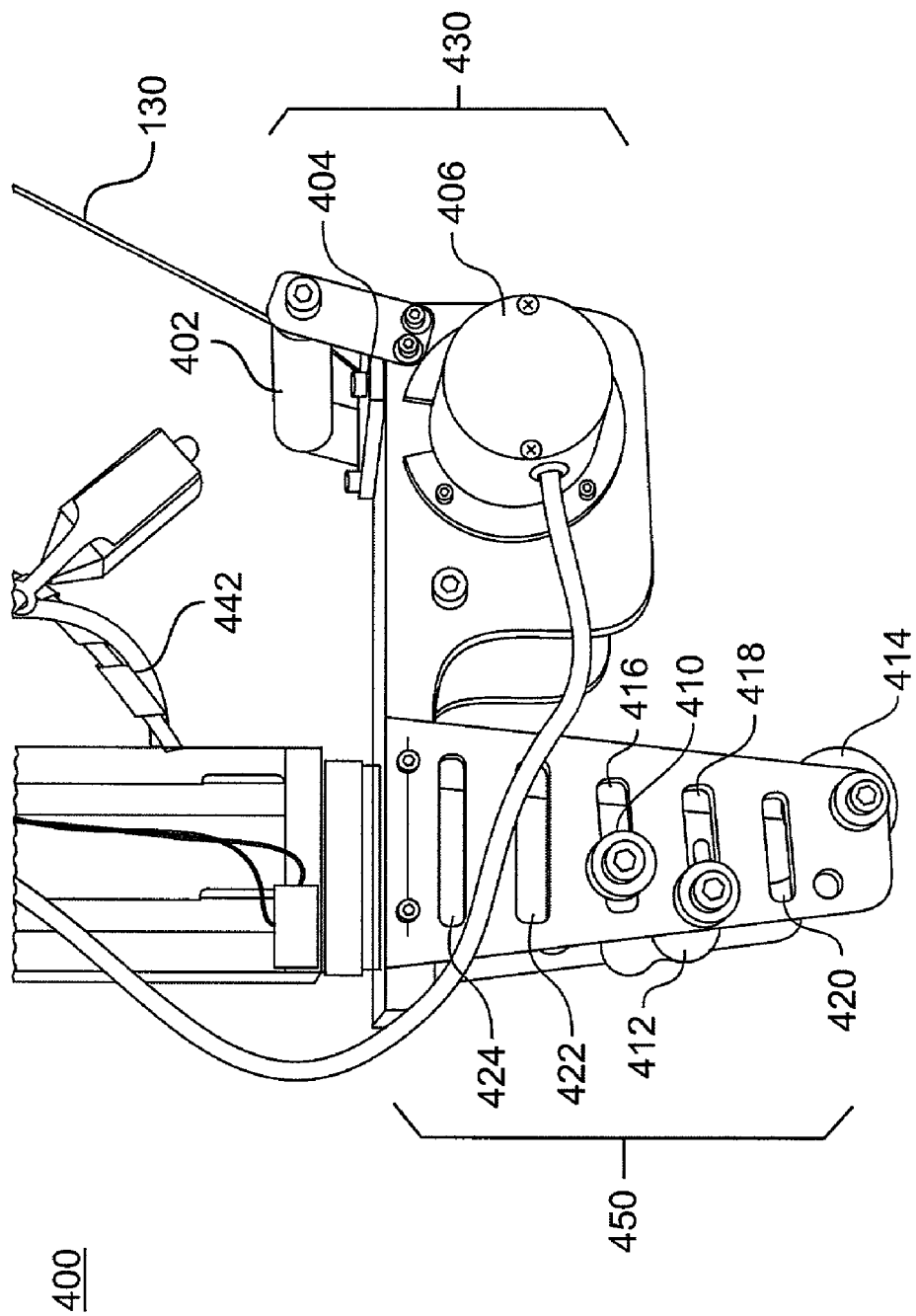
FIG. 4 is a side perspective view of a winding head of a filament winding system in accordance with an embodiment of the invention.

FIG. 4 is a side perspective view of a winding head of a filament winding system in accordance with an embodiment of the invention. As shown in FIG. 4, winding head 400 includes a fiber bundle introduction section 430, fiber bundle spreading section 450, and a resin conduit 442. In one implementation, fiber bundle introduction section 430 introduces fiber bundle 130 into fiber bundle spreading section 450. In this implementation, resin conduit 442 may then apply resin to fiber bundle 130 in fiber bundle spreading section 450. Fiber bundle spreading section 450 may then apply the resin containing filament onto a mandrel (not shown). Winding head 400 may also include other components. This implementation is merely exemplary, and other implementations may also be used.

Figure 5A:
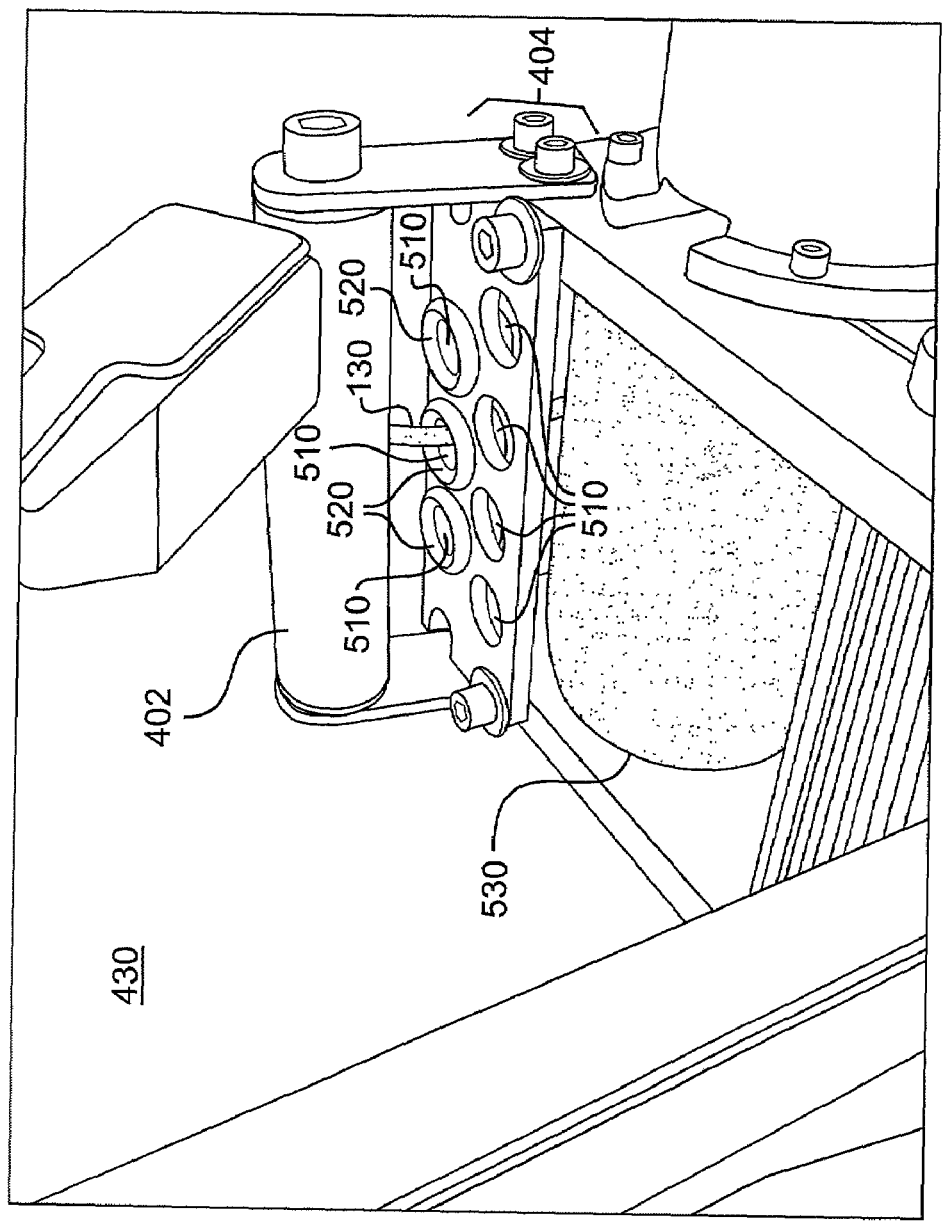
FIG. 5A is a perspective view of a fiber bundle introduction section of a winding head of a filament winding system in accordance with an embodiment of the invention, as shown in FIG. 4.

As shown in FIG. 4, fiber bundle introduction section 430 includes an initial rod 402, a winding eye section 404, and a resin metering drum 530 (not shown here, but shown in FIG. 5A). In one implementation, fiber bundle 130 passes under initial rod 402 and through winding eye section 404. Then, fiber bundle 130 rotates around resin metering drum 530 and passes into fiber bundle spreading section 450. In this implementation, initial rod 402 directs fiber bundle 130 into winding eye section 404. In one implementation, initial rod 402 rotates to adjust the tension in fiber bundle 130. These implementations are merely exemplary, and other implementations may also be used.

Winding eye section 404 is a structure containing openings or winding eyes. In one implementation, winding eye section 404 positions fiber bundle 130 as it enters fiber bundle spreading section 450. In another implementation, multiple bundles of fiber bundle 130 enter winding eye section 404, and winding eye section 404 positions these multiple bundles of fiber bundle 130 before they pass around resin metering drum 530. In this implementation, the positioning of the multiple bundles provides even application of the bundles to a mandrel. These implementations are merely exemplary, and other implementations may also be used. Winding eye section 404 is further described in FIGS. 5A–5B.

Resin metering drum 530 rotates as fiber bundle 130 passes over its surface on its way to the fiber bundle spreading section 450. Resin metering drum 530 is described in more detail in FIG. 5A. As shown in FIG. 4, in one implementation, an encoder 406 measures rotations of the resin metering drum and instructs resin pumps (not shown) to provide a measured quantity of resin to resin conduit 442. This implementation is merely exemplary, and other implementations may also be used.

Fiber bundle spreading section 450 spreads fiber bundle 130. As shown in FIG. 4, fiber bundle spreading section 450 includes two spreading rods 410 and 412 and one application rod 414. As fiber bundle 130 passes around spreading rods 410 and 412, fiber bundle 130 is spread to a desired width and passed to application rod 414. Spreading rods 410 and 412 are described in more detail in FIGS. 6A–8C. Application rod 414 then applies fiber bundle 130 to a mandrel (not shown). Application rod 414 is described in more detail in FIGS. 6A–7B. Fiber bundle spreading section 450 may comprise any number of spreading rods and/or application rods.

As shown in FIG. 4, fiber bundle spreading section 450 includes slots 416, 418, 420, 422, and 424. Slots 416, 418, 420, 422, and 424 allow the spreading rods to be shifted from side to side, which is used to alter the width of fiber bundle 130. One or more spreading rods (such as spreading rods 410 and 412) may be located in any of slots 416, 418, 420, 422, and 424. For example, as shown in FIG. 4, spreading rods 410 and 412 are located in slots 416 and 418, respectively. However, spreading rods 410 and 412 could be located in any of slots 416, 418, 420, 422, and 424. The use of the slots and spreading rods are described in more detail in FIGS. 6A–7B Fiber bundle spreading section 450 may arrange multiple bundles of fiber for application on a mandrel (not shown). Fiber bundle spreading is described in FIGS. 6A–8C.

Winding head 400 also includes resin hose 442. Resin hose 442 connects to a resin container 320 (not shown, but described in FIG. 3). Resin hose 442 transfers resin from resin container 310 to fiber bundle spreading section 450, which applies the resin to fiber bundle 130. In one implementation, resin hose 442 may be heated to approximately 165 degrees Fahrenheit. However, resin hose 442 may be heated to other temperatures or not heated at all. These implementations are merely exemplary, and other implementations may also be used.

FIG. 5A is a perspective view of a fiber bundle introduction section of a winding head of a filament winding system in accordance with an embodiment of the invention, as shown in FIG. 4. As shown in FIG. 5A, fiber bundle introduction section 430 includes initial rod 402, winding eye section 404, and resin metering drum 530. In one implementation, fiber bundle 130 passes under initial rod 402, into winding eye section 404, and around and under drum 530.

Winding eye section 404 comprises a series of winding eyes 510. As shown in FIG. 5A, winding eyes 510 include seven winding eyes, but any number of winding eyes may be used. The number of winding eyes 510 determines the number of fiber bundles 130 that can be applied by winding head 110. FIG. 5A illustrates one fiber bundle 130 passing through a winding eye 510, but more than one fiber bundle 130 may be used. This implementation is merely exemplary, and other implementations may also be used.

In one implementation, winding eyes 510 in winding eye section 404 may be spaced apart such that, as each fiber bundle 130 is applied to a mandrel (not shown), the fiber bundles 130 are arranged parallel to one another in a touching manner. In another implementation, winding eyes 510 in winding eye section 404 may also include inserts 520. Inserts 520 are placed in winding eyes 510 to prevent fiber bundle 130 from being damaged as it passes through winding eyes 510. In one implementation inserts 520 are ceramic and circular. These implementations are merely exemplary, and other implementations may also be used.

Resin metering drum 530 may be a drum for measuring the length of fiber bundle 130 moving into fiber bundle spreading section 450. In one implementation, drum 530 is rotated by fiber bundle 130 passing against its surface. In this implementation, drum 530 has a rubber face. The rubber face allows drum 530 to be rotated by fiber bundle 130 passing over its surface. Rotation is then encoded as length by encoder 406 (not shown, but shown in FIG. 4), which then instructs resin pumps to provide a measured quantity of resin to resin conduit 442. Resin metering drum 530 may be located as shown in FIG. 5A where it is turned by multiple fiber bundles or it may be located where it is turned by just fiber bundle 130. This implementation is merely exemplary, and other implementations may also be used.

Figure 5B:
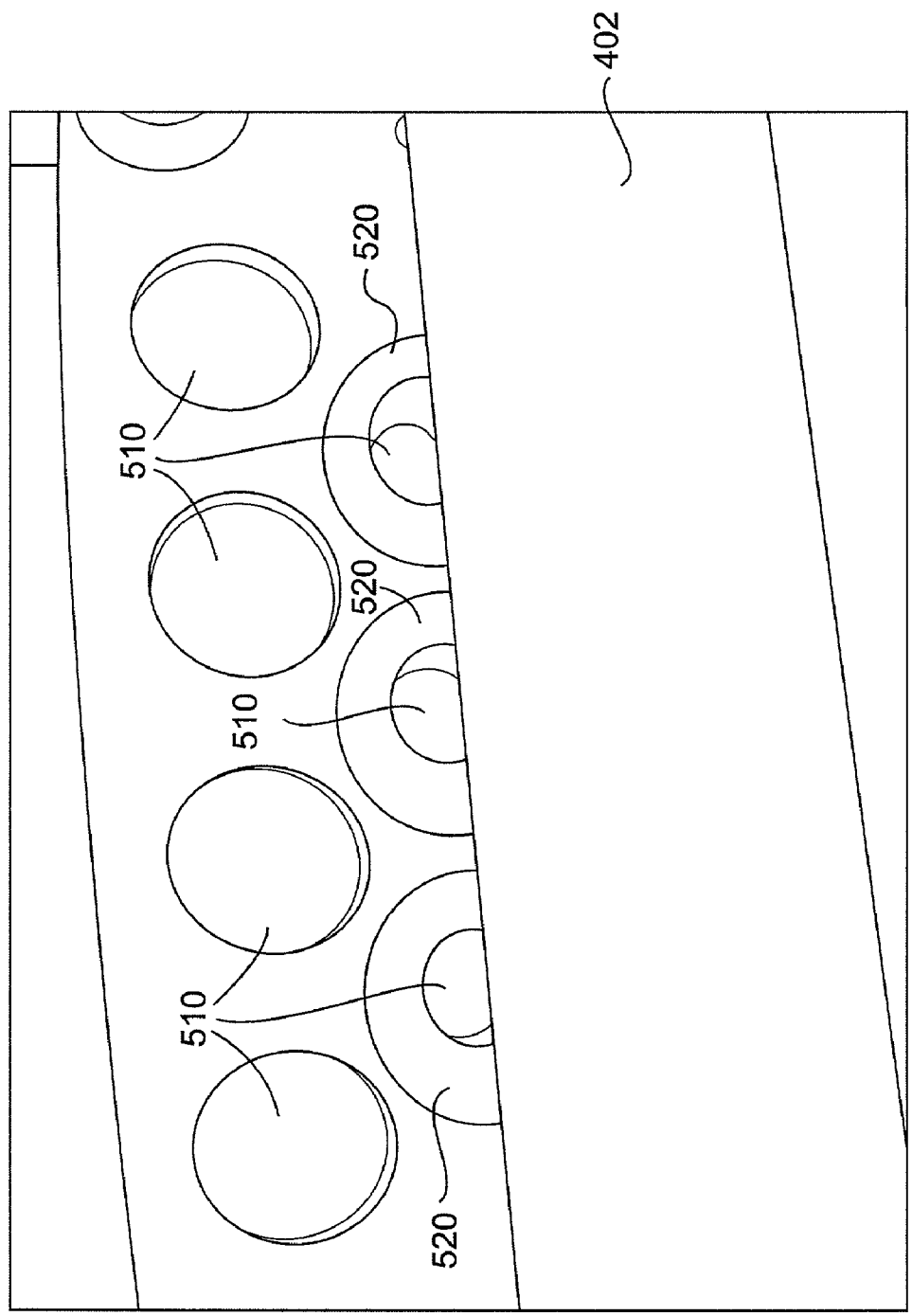
FIG. 5B is a perspective view of a winding eye section of a fiber bundle introduction section of a winding head in accordance with an embodiment of the invention, as shown in FIG. 5A.

FIG. 5B is a perspective view of a winding eye section of a fiber bundle introduction section of a winding head in accordance with an embodiment of the invention, as shown in FIG. 5A. As shown in FIG. 5B, winding eye section 404 comprises a series of winding eyes 510 in relation to initial rod 402. In one implementation, winding eyes 510 are equally spaced apart. This spacing allows for equal spreading of fibers in each fiber bundle 130 as the fibers pass through winding eyes 510. In this implementation, winding eyes 510 may also include circular inserts 520. This implementation is merely exemplary, and other implementations may also be used.

Figure 6A:
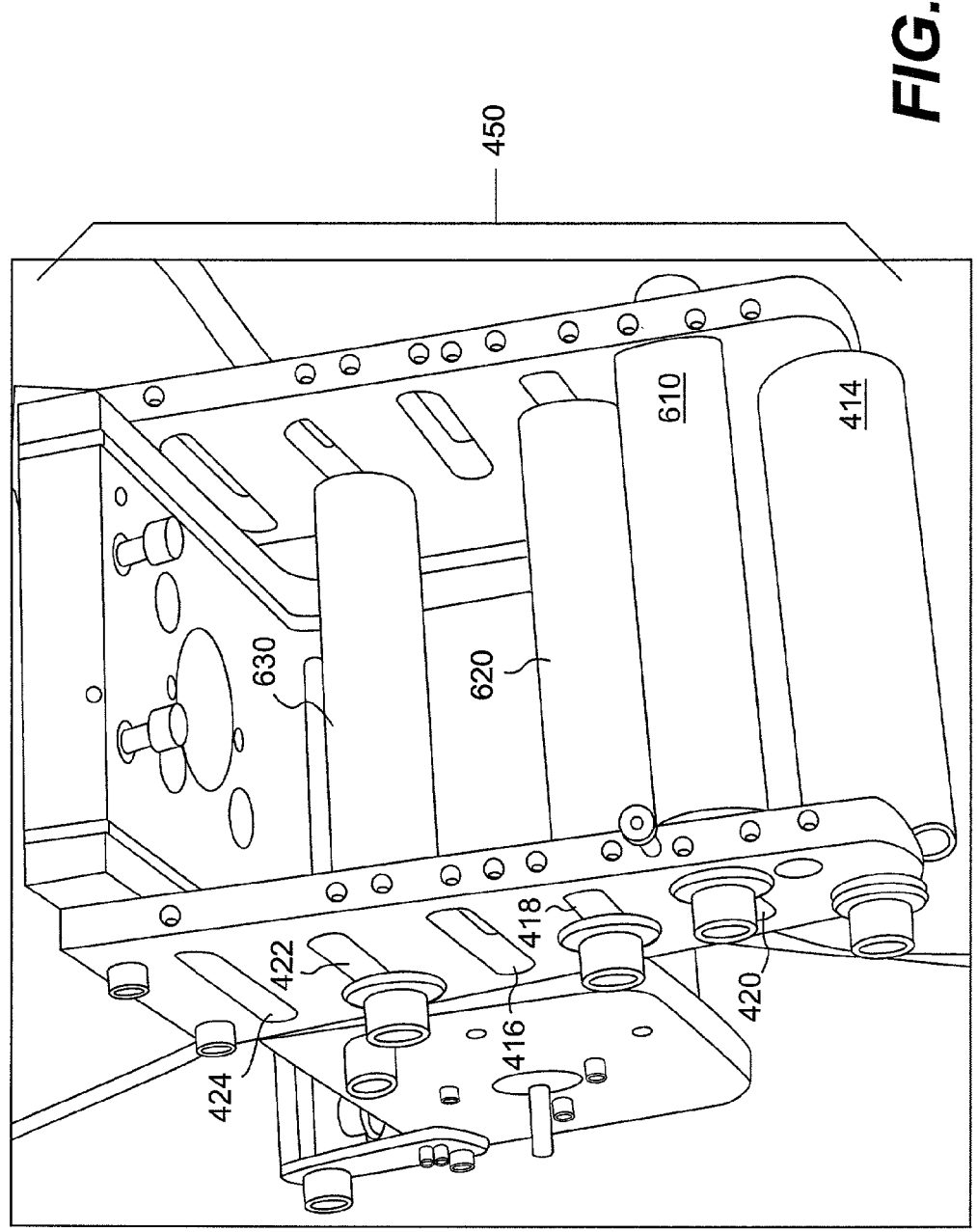
FIG. 6A is a perspective view of a fiber bundle spreading section of a winding head of a filament winding system in accordance with an embodiment of the invention, as shown in FIG. 4.

FIG. 6A is a perspective view of a fiber bundle spreading section of a winding head of a filament winding system in accordance with an embodiment of the invention, as shown in FIG. 4. As shown in FIG. 6A, in one implementation, fiber bundle spreading section 450 includes spreading rods 610, 620, and 630 located in slots 420, 418, and 422, respectively, and application rod 414. This implementation is merely exemplary, and other implementations may also be used.

In one implementation, spreading rods 610, 620, and 630 may be used for altering the width of fiber bundle 130 (not shown). As fiber bundle 130 passes over, under or around spreading rods 610, 620 and 630, friction heat generated by the rubbing of fiber bundle 130 against spreading rods 610, 620 and 630 causes a coating on fiber bundle 130 to lose its cohesive properties. Fiber bundle 130 subsequently spreads to redistribute tension in the individual filaments as they are made to pass along varying distances. Altering the tension in fiber bundle 130 as it passes over, under or around spreading rods 610, 620, and 630 alters the amount of spreading of fiber bundle 130. For example, the tension for four bundles of fiber bundle 130 would be in the range of 24 to 30 pounds at the point that fiber bundle 130 is applied to a mandrel (not shown). These implementations are merely exemplary, and other implementations may also be used.

In one implementation, the tension in fiber bundle 130 is altered by increasing or decreasing the number of spreading rods used in fiber bundle spreading section 450. In another implementation, the tension in fiber bundle 130 is altered by changing the location of the spreading rods in fiber bundle spreading section 450. In still another implementation, the tension in fiber bundle 130 is altered by changing the location of the spreading rods in slots 416, 418, 420, 422, and 424. For example, as shown in FIG. 6A, spreading rod 630 is located at the aft end of slot 422, spreading rod 620 is located near the center of slot 418, and spreading rod 610 is located near the forward end of slot 420. These implementations are merely exemplary, and other implementations may also be used.

In yet another implementation, the tension in fiber bundle 130 is altered by changing the nature of the spreading rods. For example, as shown in FIG. 6A, spreading rods 630 and 620 are straight non-rotating cylindrical rods, while spreading rod 610 is a curved non-rotating cylindrical rod. In this implementation, the curvature of spreading rod 610 acts to increase the spread of fiber bundle 130 following the tension increase and heating caused by contact with non-rotating spreading rods 630 and 620. In another implementation, the tension of the filament may be altered by allowing rotation of the spreading rods. These implementations are merely exemplary, and other implementations may also be used.

Figure 6B:
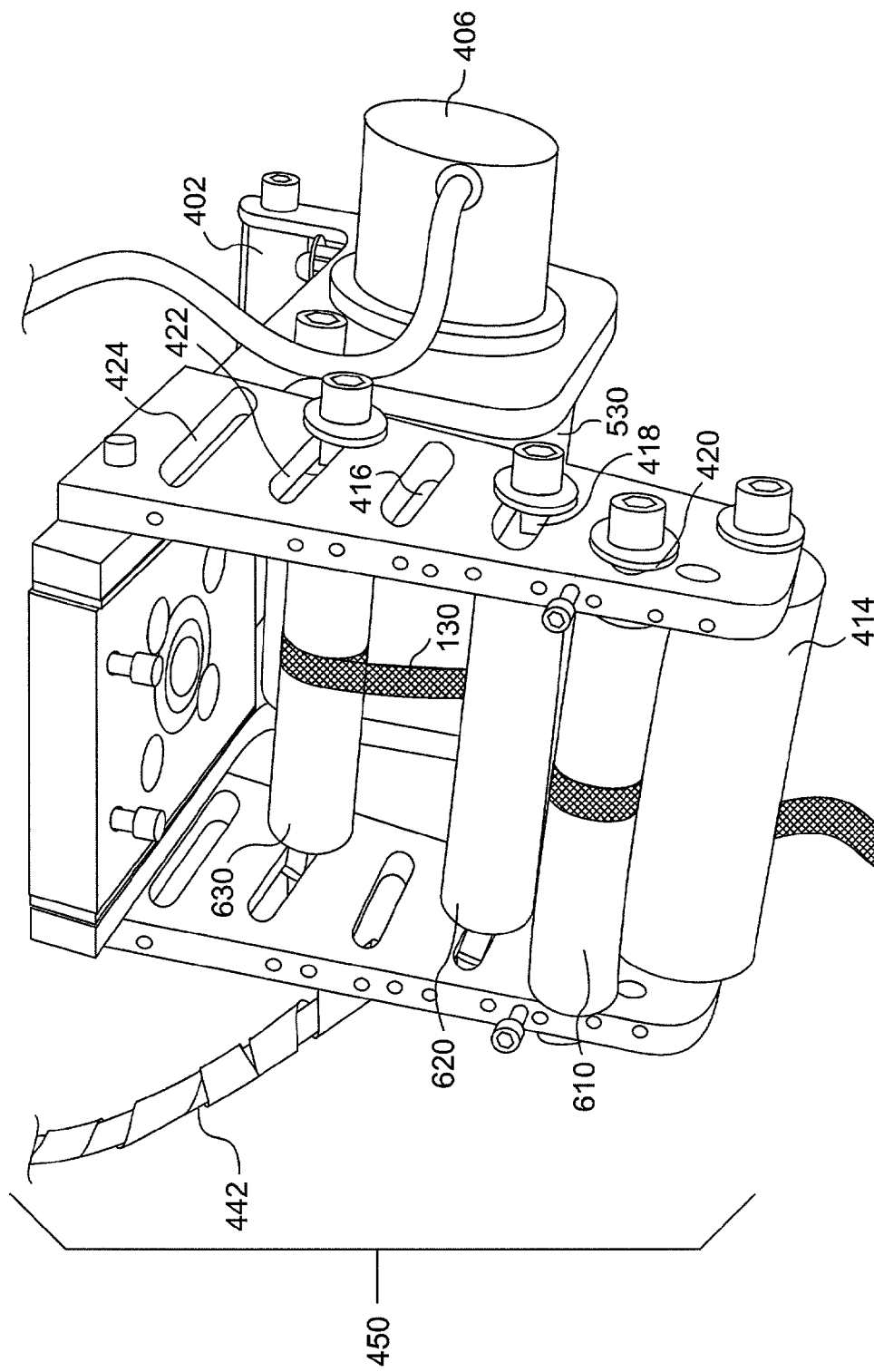
FIG. 6B is a perspective view of a fiber bundle spreading section with a fiber bundle in accordance with an embodiment of the invention, as shown in FIG. 6A.

FIG. 6B is a perspective view of a fiber bundle spreading section with a fiber bundle in accordance with an embodiment of the invention, as shown in FIG. 6A. As shown in FIG. 6B, fiber bundle spreading section 450 includes three spreading rods 610, 620, and 630 in slots 420, 418, and 422, respectively, and application rod 414, as shown in FIG. 6A. FIG. 6B also shows fiber bundle 130.

As shown in FIG. 6B, in one implementation, fiber bundle 130 passes over spreading rod 630, under spreading rod 620, over spreading rod 610, and under application rod 414. As described above, the friction caused by the passing of fiber bundle 130 over or under spreading rods 610, 620, and 630 and application rod 414 heats fiber bundle 130. As fiber bundle 130 is heated and made to pass around non-rotating curved spreading rod 610, a coating on fibers in fiber bundle 130 loses its cohesive properties. Fiber bundle 130 subsequently spreads to redistribute the tension in the individual filaments. In this implementation, fiber bundle 130 is paid out from application rod 414 in a flat ribbon format. This implementation is merely exemplary, and other implementations may also be used.

As shown in FIG. 6B, fiber bundle spreading section 450 also includes a resin hose 442. Resin hose 442 connects to a resin container 320 (not shown, but described in FIG. 3). Resin hose 442 transfers resin from resin container 320 and applies the resin to at least one of spreading rods 610, 620, and/or 630. Thus, as heated fiber bundle 130 passes over at least one of spreading rods 610, 620, and 630, fiber bundle 130 is impregnated with resin. In one implementation, resin hose is heated to approximately 165 degrees Fahrenheit. If the resin is heated, the resin may be applied to fiber bundle 130 while hot. As the resin passes around application rod 414, the resin begins to cool, and then, upon contacting the mandrel, the resin on fiber bundle 130 cools to room temperature. This implementation is merely exemplary, and other implementations (e.g., other temperatures for the resin) may also be used.

As an additional example, in one implementation, resin hose 442 applies the resin to one or more of the spreading rods. However, resin may be applied in any manner. For example, resin may be first drizzled or sprayed on the mandrel (not shown), and then fiber bundle 130 may be applied on top of the resin-impregnated mandrel. In another implementation, fiber bundle spreading section 450 may include a resin metering device (not shown). The resin metering device may signal resin hose 442 to apply resin, as needed. These implementations are merely exemplary, and other implementations may also be used.

As shown in FIG. 6B, in one implementation, fiber bundle spreading section 450 may be used with a single fiber bundle 130 to create a ⅓ inch wide fiber band. In this implementation, a single fiber bundle 130 passes over spreading rod 630, which begins to generate heat. As fiber bundle 130 proceeds under spreading rod 620, fiber bundle 130 spreads. As fiber bundle 130 proceeds over curved spreading rod 610, fiber bundle 130 spreads to a width of greater than ⅓ inch. Finally, as fiber bundle 130 proceeds under application rod 414, the width would be reduced to ⅓ inch. In another implementation, four fiber bundles 130 would be used, which are all spread to ⅓ inch each. In this implementation, application rod would apply a band of filament approximately 1⅓ inches wide (4×⅓ inch). These implementations are merely exemplary, and other implementations may also be used.

Figure 6C:
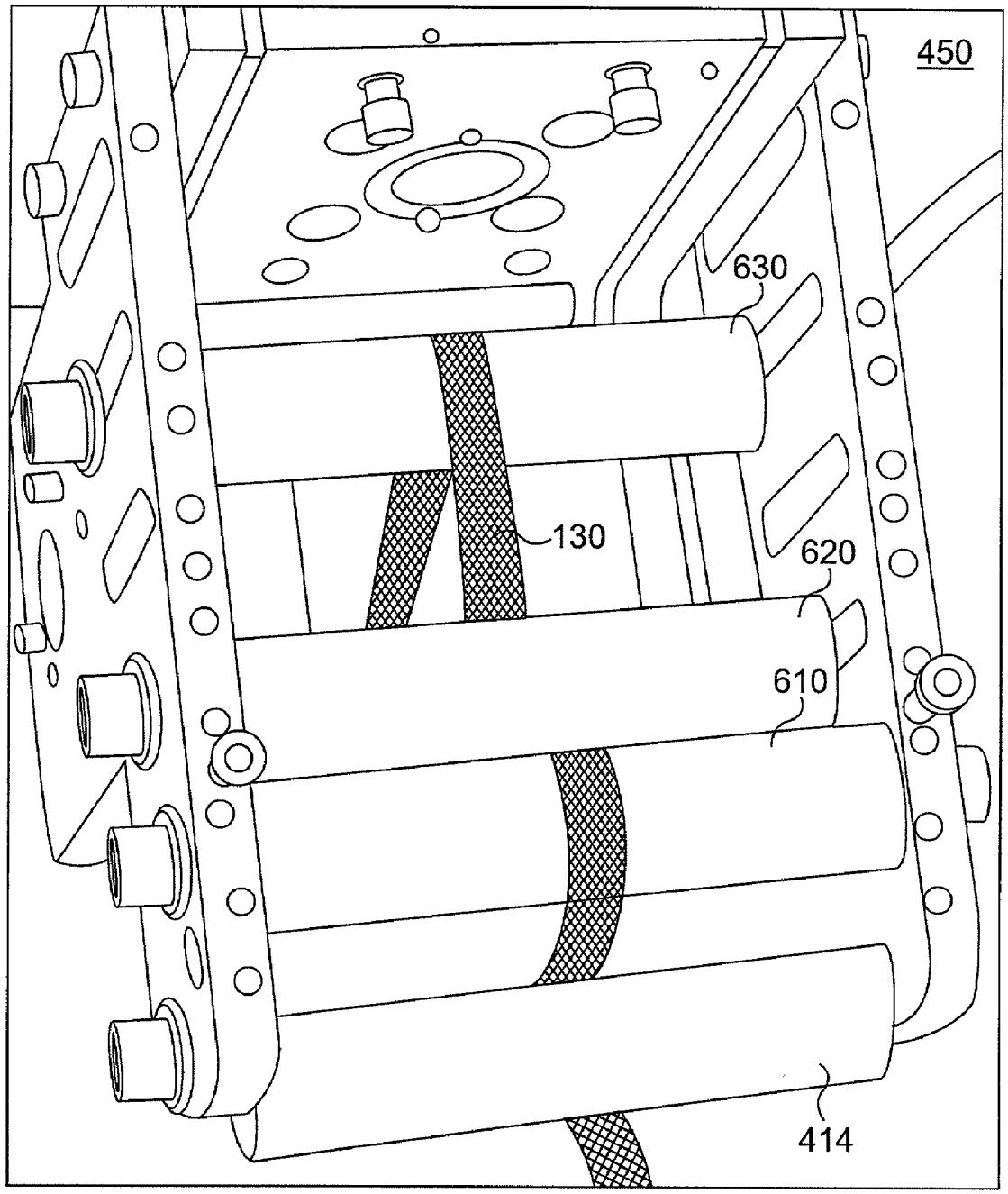
FIG. 6C is a front perspective view of a fiber bundle spreading section with a fiber bundle in accordance with an embodiment of the invention, as shown in FIGS. 6B.

FIG. 6C is a front perspective view of a fiber bundle spreading section with a fiber bundle in accordance with an embodiment of the invention, as shown in FIG. 6B. As shown in FIG. 6C, fiber bundle spreading section 450 includes spreading rods 610, 620, and 630 and application rod 414. In one implementation, fiber bundle 130 passes over spreading rod 630, under spreading rod 620, over spreading rod 610, and under application rod 414. This implementation is merely exemplary, and other implementations may also be used.

Figure 6D:
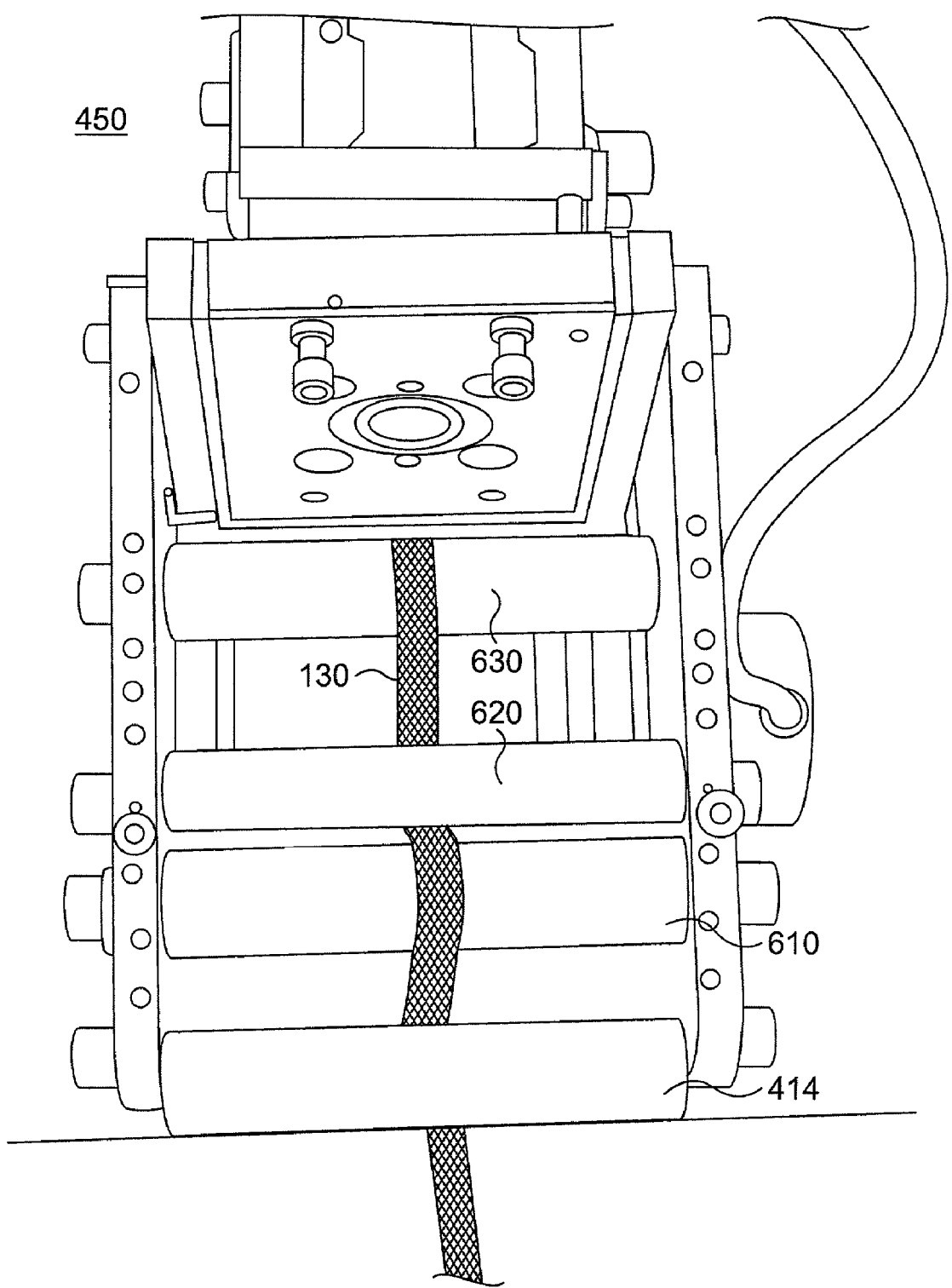
FIG. 6D is another front view of a fiber bundle spreading section of a winding head of a winding system with a fiber bundle in accordance with an embodiment of the invention, as shown in FIG. 6C.

FIG. 6D is another front view of a fiber bundle spreading section of a winding head of a winding system with a fiber bundle in accordance with an embodiment of the invention, as shown in FIG. 6C. As shown in FIG. 6D, fiber bundle 130 passes over spreading rod 630, under spreading rod 620, over spreading rod 630, and under application rod 414. This implementation is merely exemplary, and other implementations may also be used.

Figure 7A:
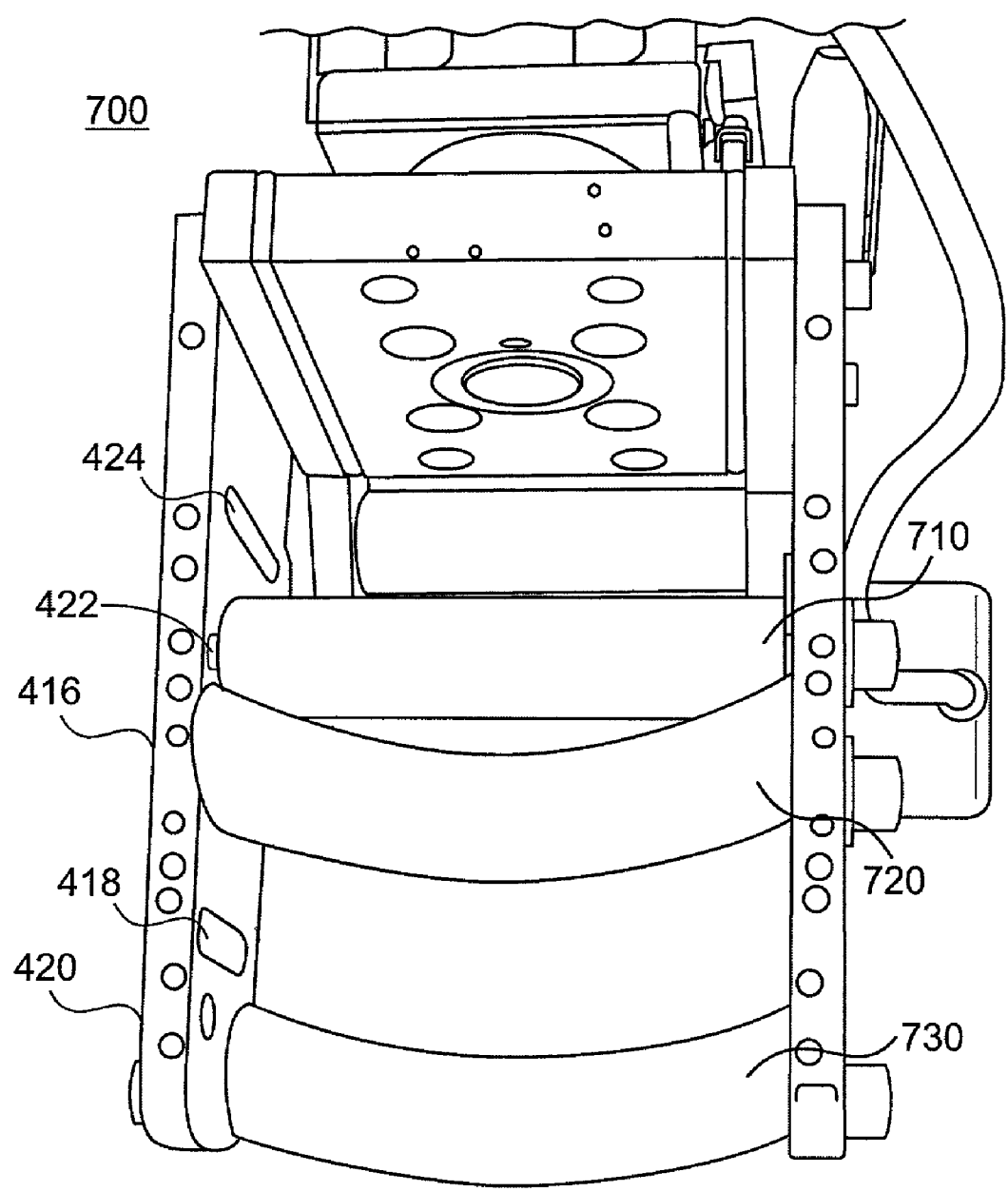
FIG. 7A is a front perspective view of a fiber bundle spreading section of a winding head of a filament winding system in accordance with another embodiment of the invention, as shown in FIG. 4.

FIG. 7A is a front perspective view of a fiber bundle spreading section of a winding head of a filament winding system in accordance with another embodiment of the invention, as shown in FIG. 4. As shown in FIG. 7A, in this implementation, filament spreading section 700 includes spreading rods 710 and 720 and application rod 730. In this implementation, spreading rod 710 is a straight cylindrical rod, spreading rod 720 is a curved cylindrical rod, and application rod 730 is a curved cylindrical rod. Further, in this implementation, spreading rod 710 is located near the center of slot 422, and spreading rod 720 is located near the forward end of slot 416. Nothing is located in slots 418 and 424. Curved spreading rods are depicted in more detail in FIGS. 8A–8C. This implementation is merely exemplary, and other implementations may also be used.

Figure 7B:
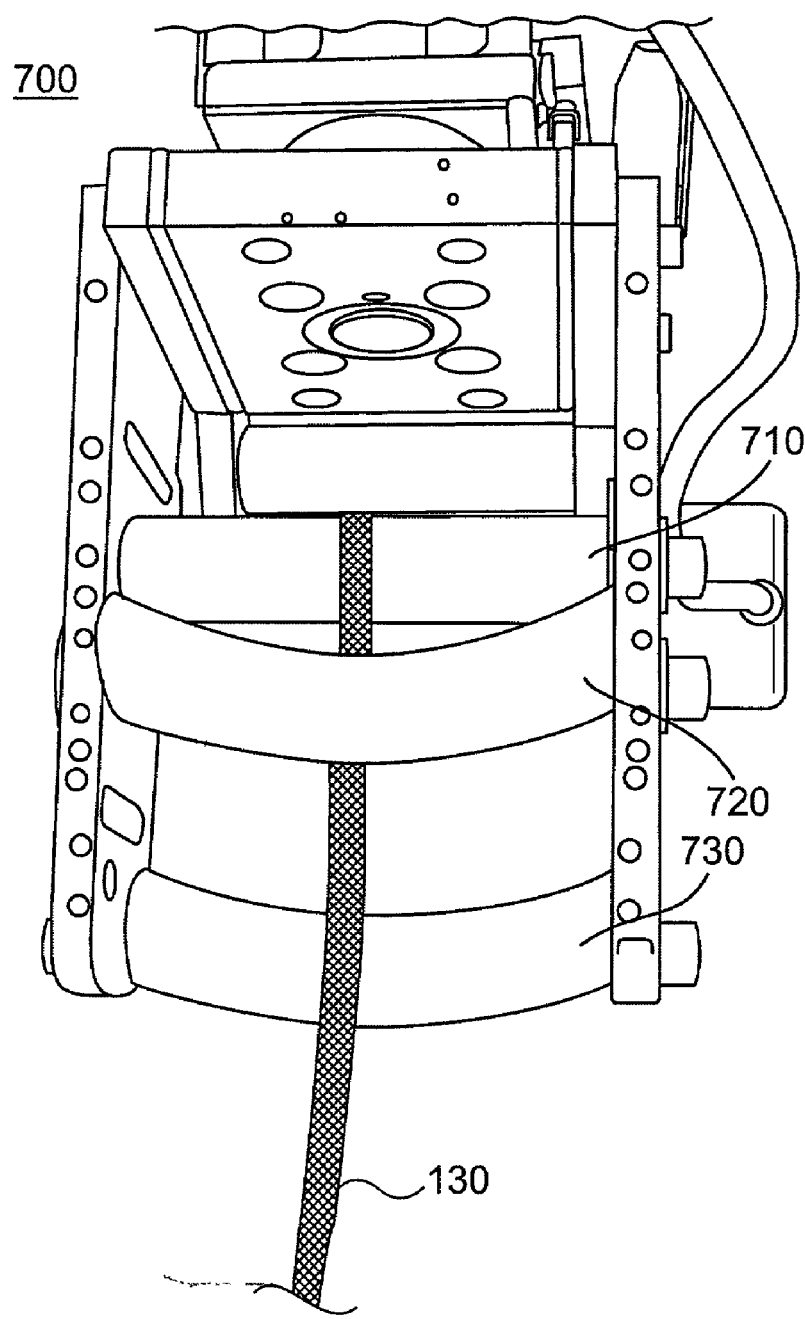
FIG. 7B is a front view of a fiber bundle spreading section of a winding head of a winding system with a fiber bundle in accordance with an embodiment of the invention, as shown in FIG. 7A.

FIG. 7B is a front view of a filament fiber bundle section of a winding head of a winding system with a fiber bundle in accordance with an embodiment of the invention, as shown in FIG. 7A. As shown in FIG. 7B, and like FIG. 7A, filament spreading section 700 includes spreading rods 710 and 720 and application rod 730. In one implementation, fiber bundle 130 passes over spreading rod 710, under spreading rod 720, and over application rod 730. As described above, a curved spreading rod (or curved application rod) may be used to manipulate the width of fiber bundle 130. This implementation is merely exemplary, and other implementations may also be used.

Figure 8A:
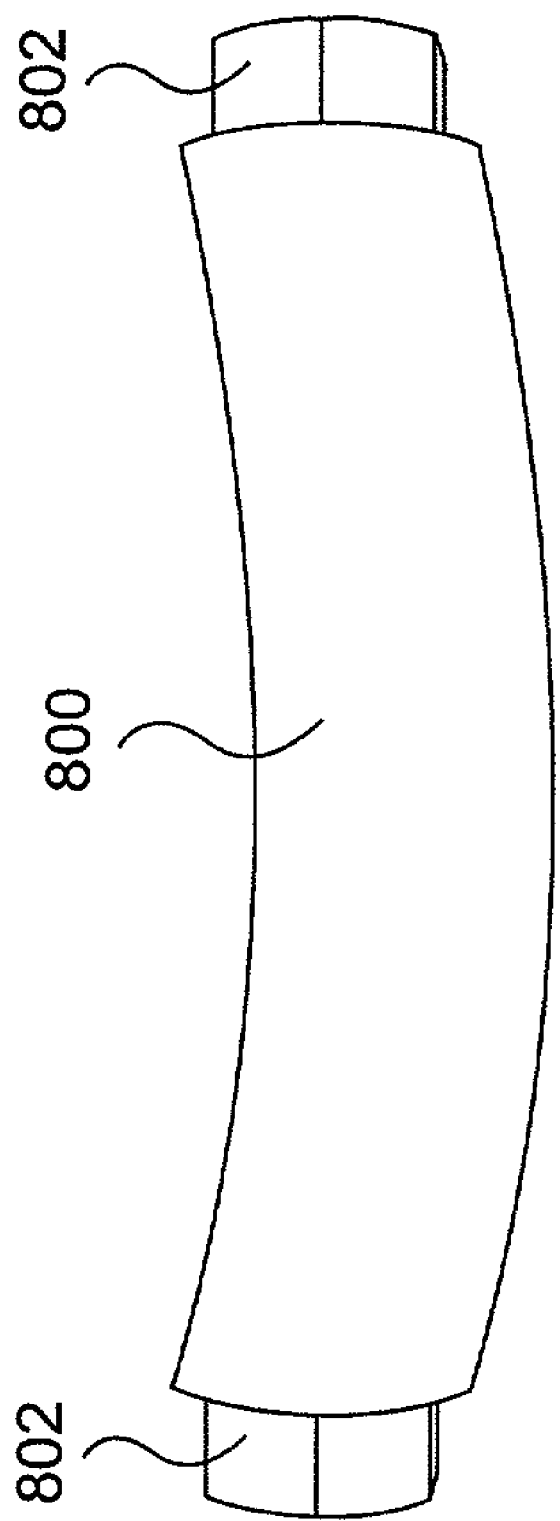
FIG. 8A is a front view of a curved spreading rod of a winding head of a filament winding system in accordance with an embodiment of the invention, as shown in FIGS. 7A–7B.

FIG. 8A is a front view of a curved spreading rod of a winding head of a filament winding system in accordance with an embodiment of the invention, as shown in FIGS. 7A–7B. As shown in FIG. 8A, curved spreading rod 800 has an arced shape, which can be used to create varying tension in a fiber bundle. As described above, this tension may be used to manipulate the width of the fiber bundle. In one implementation, rod 800 also includes bolts 802. Bolts 802 allow rod 800 to be secured to slots in a winding head (not shown here, but shown in FIGS. 6A–7B), as described above. In one implementation, rod 800 is manufactured from steel. This implementation is merely exemplary, and other implementations and other materials may also be used.

Figure 8C:
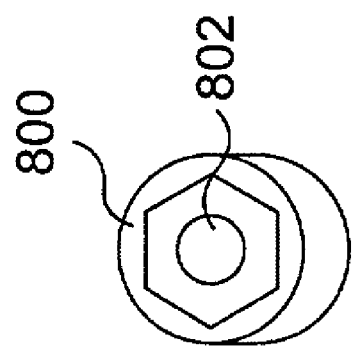
FIG. 8C is a detail end view of a curved spreading rod in accordance with an embodiment of the invention, as shown in FIGS. 8A–8B.
Figure 8B:
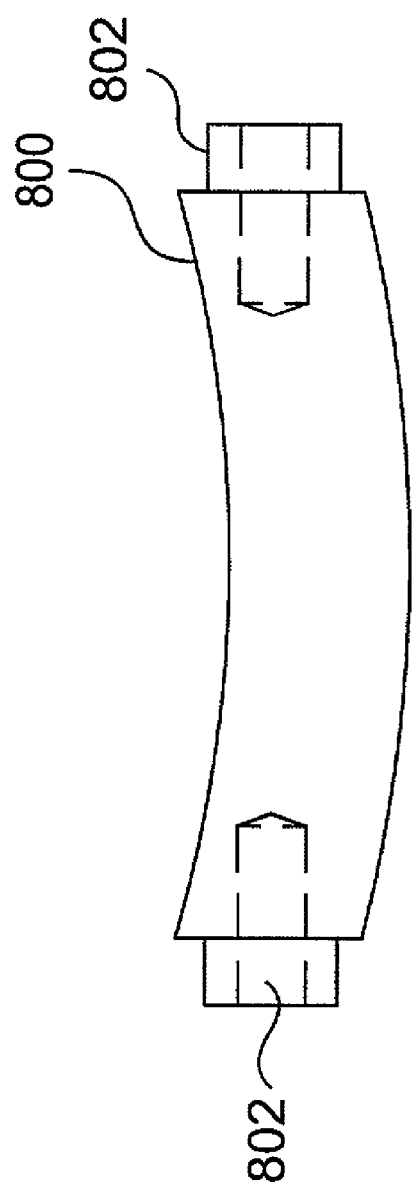
FIG. 8B is a detail side view of a curved spreading rod in accordance with an embodiment of the invention, as shown in FIG. 8A.

FIG. 8B is a detail side view of a curved spreading rod in accordance with an embodiment of the invention, as shown in FIG. 8A. As shown in FIG. 8B, curved spreading rod 800 includes bolts 802. In one implementation, a portion of the interior of rod 800 may be threaded so that bolts 802 may be screwed and unscrewed from rod 800. This implementation is merely exemplary, and other implementations may also be used.

FIG. 8C is a detail end view of a curved spreading rod in accordance with an embodiment of the invention, as shown in FIGS. 8A–8B. As shown in FIG. 8C, curved spreading rod 802 includes bolts 802 for securing rod 800 to a filament spreading section of a winding head. This implementation is merely exemplary, and other implementations may also be used.

FIGS. 1–8 describe various implementations of a filament winding system 100. FIGS. 9–15 describe filament winding systems for complex structures.

Figure 9A:
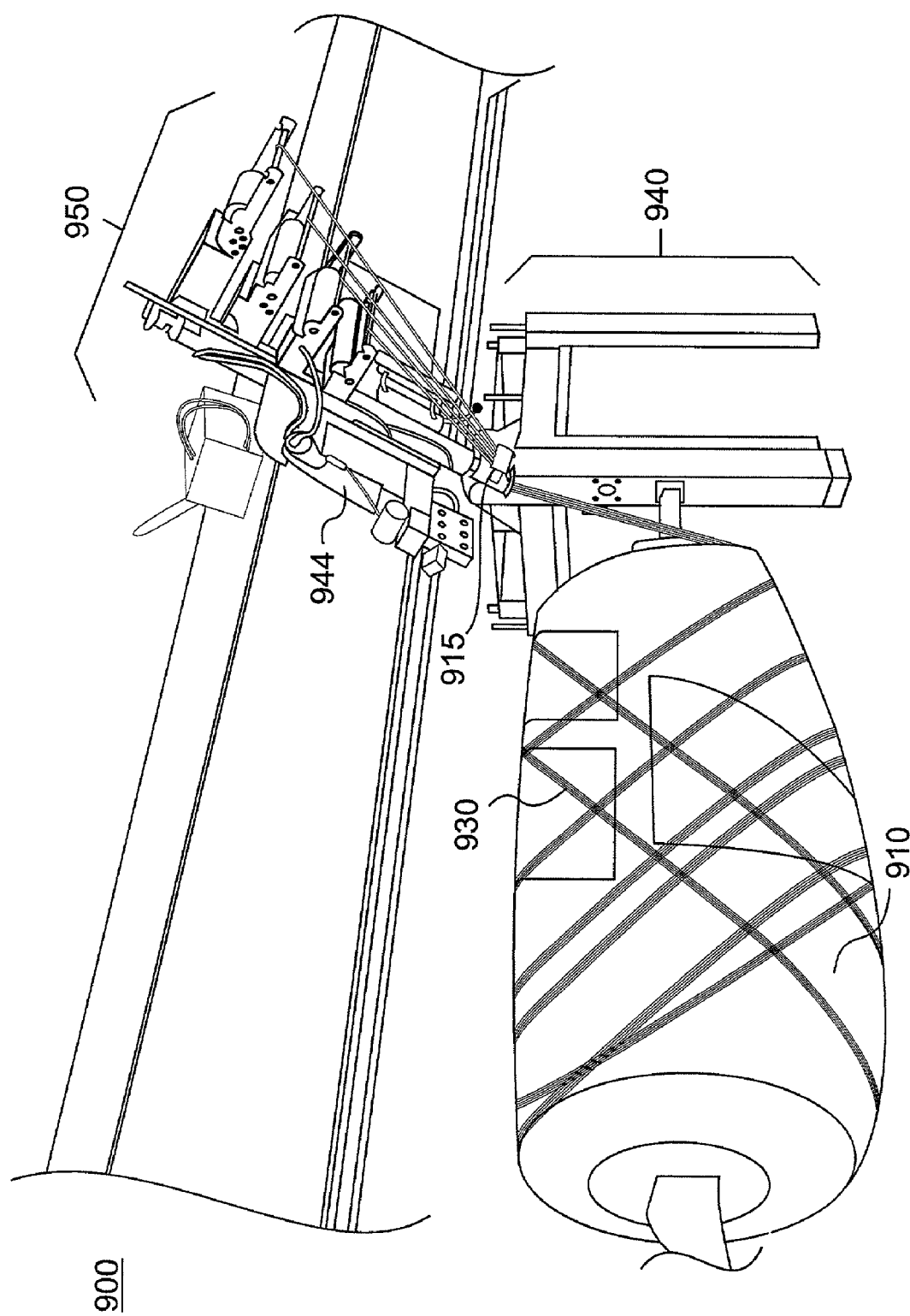
FIG. 9A illustrates the fiber bundle winding of a complex mandrel with a filament winding system in accordance with an embodiment of the invention.

FIG. 9A illustrates the fiber bundle winding of a complex mandrel with a filament winding system in accordance with an embodiment of the invention. As shown in FIG. 9A, filament winding system 900 applies fiber bundle 930 to a fuselage mandrel 910. Winding system 900 includes a mandrel section 940, a fiber bundle application section 950, a winding head 915, a transport 944, and a controller (not shown). Fuselage mandrel 910 contains a more complex structure than mandrel 108 shown in FIG. 1. For example, the circumference of mandrel 108 in FIG. 1 is constant, whereas mandrel 910 has a varying circumference. Achieving an even thickness on a complex structure may require a more complicated filament winding system. FIGS. 10–15 describe the process of winding complex structures.

Figure 9B:
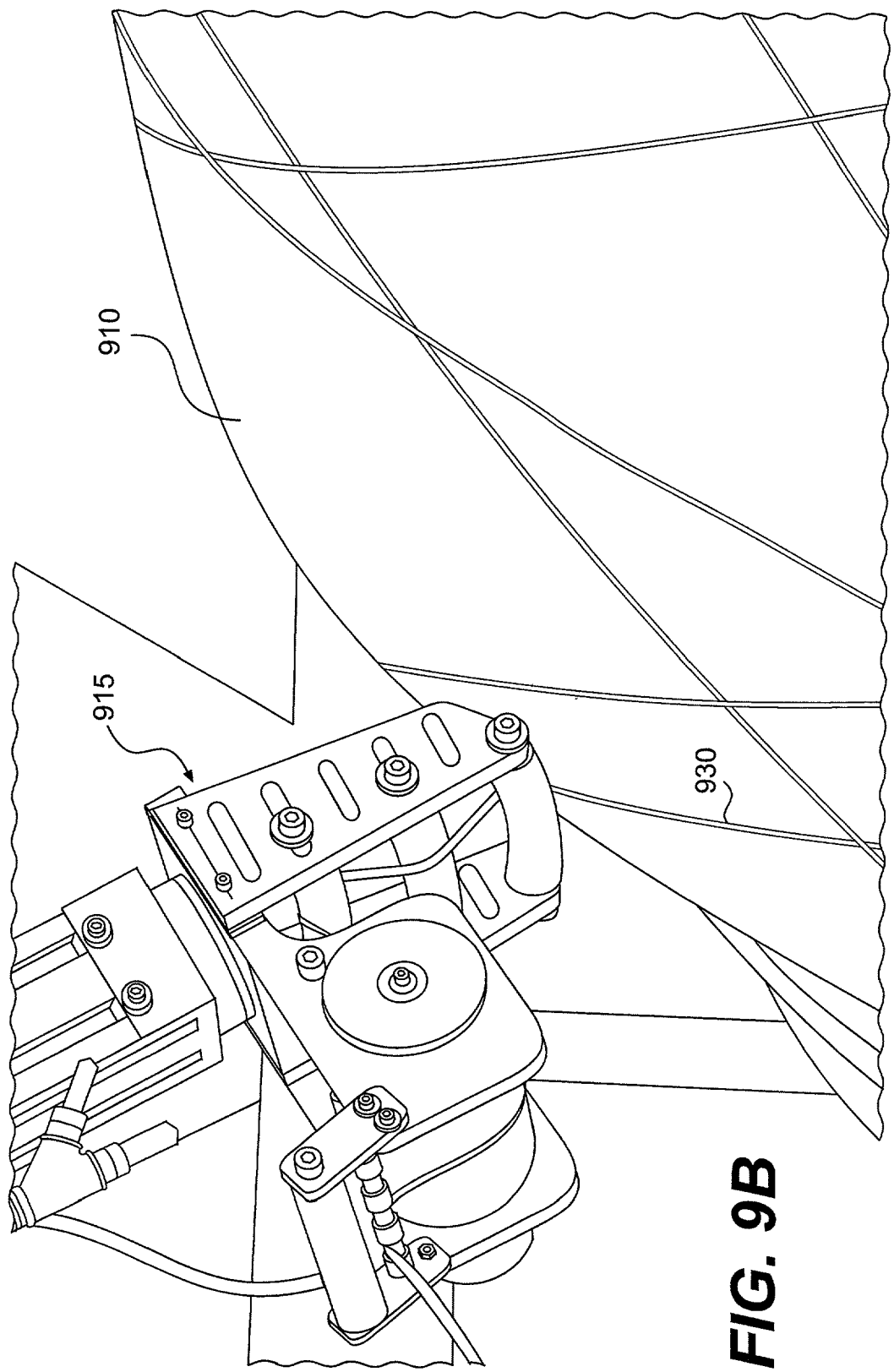
FIG. 9B illustrates the fiber bundle winding of a complex mandrel with a winding head of a filament winding system in accordance with an embodiment of the invention, as shown in FIG. 9A.

FIG. 9B illustrates the fiber bundle winding of a complex mandrel with a winding head of a filament winding system in accordance with an embodiment of the invention, as shown in FIG. 9A. As shown in FIG. 9B, winding head 915 applies fiber bundle 930 to fuselage mandrel 910. As stated above, fuselage mandrel 910 is a more complex structure than mandrel 108 shown in FIG. 1. In this implementation, winding head 915 can filament wind the more complex structure of mandrel 910. Winding head 915 may also include other components. This implementation is merely exemplary, and other implementations may also be used.

Figure 10:
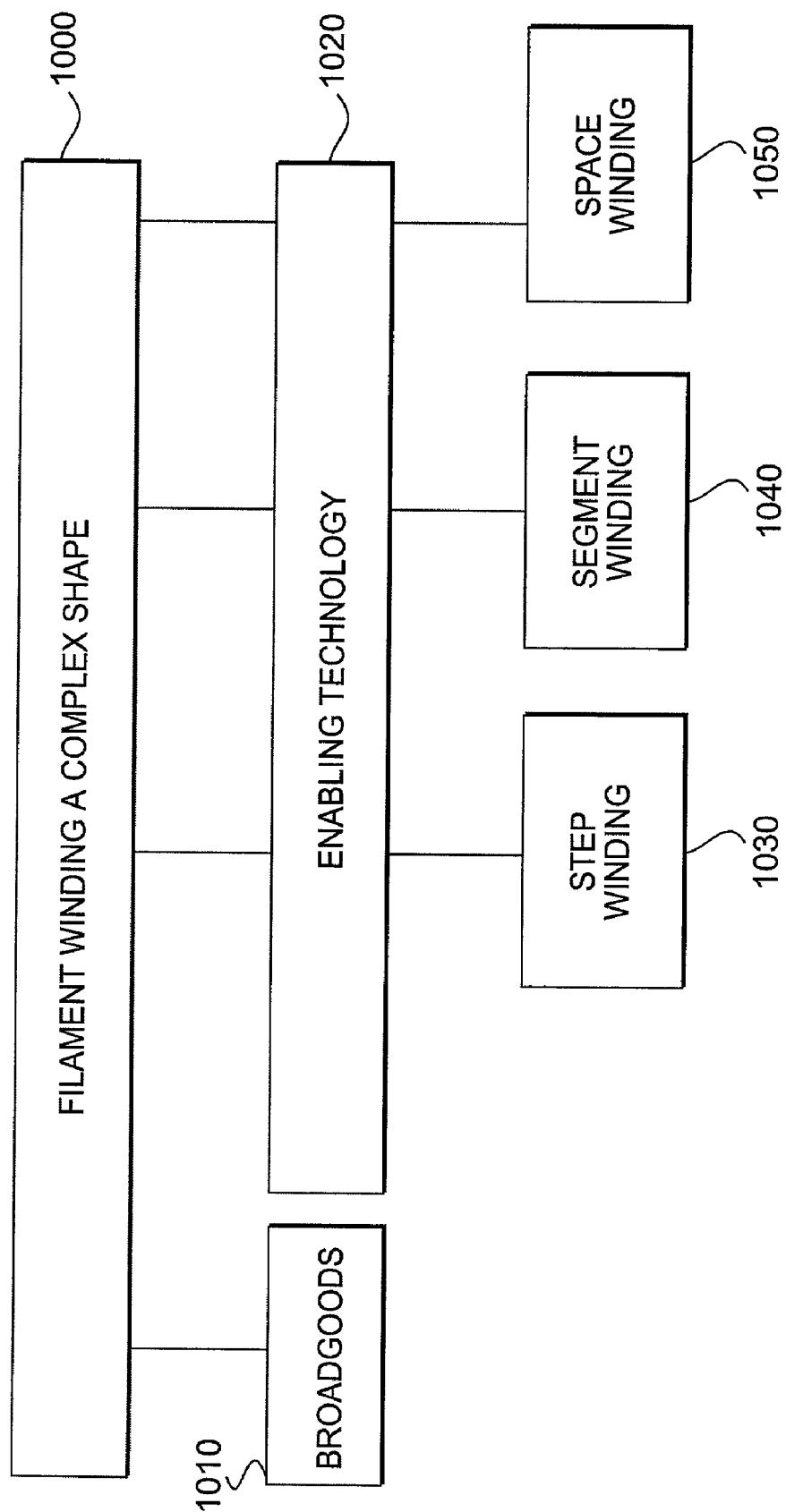
FIG. 10 is a block diagram illustrating technology for fiber bundle winding on a complex mandrel in accordance with an embodiment of the invention.

FIG. 10 is a block diagram illustrating technology for fiber bundle winding a complex mandrel in accordance with an embodiment of the invention. As shown in FIG. 10, there are several components of winding a complex shape 1000. These components include broadgoods 1010 and enabling technology 1020. Other components may also be used.

Broadgoods 1010 includes the placement of filament-wound broadgoods onto a complex shape structure, such as a complex mandrel. In one implementation, a filament winding system does not apply filament directly to the complex mandrel, such as filament winding system 900 on fuselage mandrel 910 in FIG. 9A. Rather, in this implementation, the filament winding system creates a skin on a simple mandrel, and then, this skin is cut to form the broadgoods. In this implementation, the broadgoods are then applied to a complex mandrel to create the skin of the complex structure. This implementation is merely exemplary, and other implementations may also be used. Also, broadgoods 1010 is described in more detail in FIG. 11.

Enabling technology 1010 includes the application of filament onto a complex mandrel by a filament winding system. Enabling technology 1010 includes the use of a computer to control the filament winding system. In one implementation, a computer model of the complex shape is made using the computer. Then, the computer calculates the ideal path for obtaining a substantially constant skin thickness on the complex shape. In order to wind the structure according to the ideal path, the computer controls multiple axes of movement. In one implementation, the computer controls the rotation of the mandrel, the movement of the filament application section, the distance between the winding head and the mandrel, and the articulation of the spool section. The computer may also control other axes of movement. For example, an elbow type movement could be implemented in the arm section. In one implementation, enabling technology 1010 comprises a commercially available CADWIND software program. These implementations are merely exemplary, and other implementations may also be used.

As shown in FIG. 10, enabling technology 1020 includes fiber path methodologies step winding 1030, segment winding 1040, and space winding 1050. Step winding 1030, segment winding 1040, and space winding 1050 are three methodologies used by enabling technology 1020 for winding a complex structure. Step winding 1020 is described in more detail in FIG. 13. Segment winding 1030 is described in more detail in 14. Space winding 1040 is described in more detail in FIG. 15.

Figure 11:
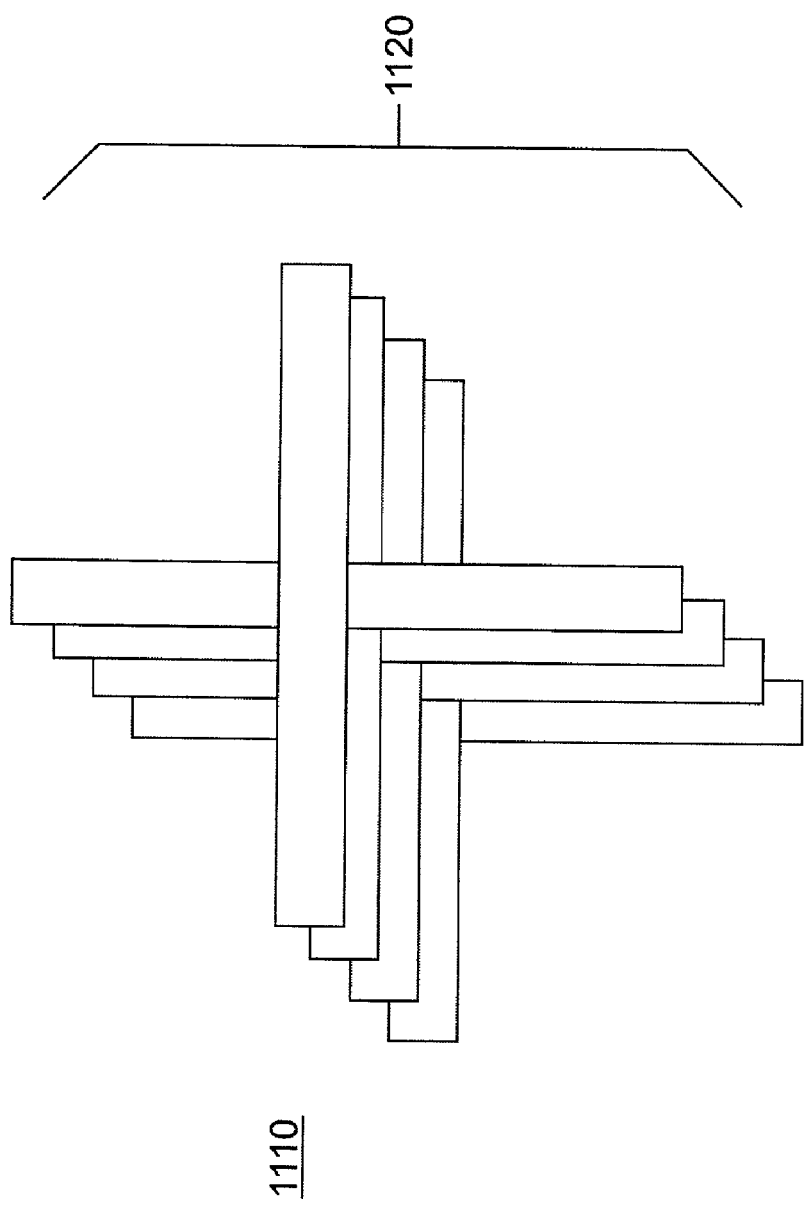
FIG. 11 depicts a broadgood winding methodology for use in a complex structure in accordance with an embodiment of the invention, as shown in FIG. 10.

FIG. 11 depicts a broadgood winding methodology for use in a complex structure in accordance with an embodiment of the invention, as shown in FIG. 10. As shown in FIG. 11, a half overlap winding pattern for broadgoods may be used to create a complex structure, such as broadgoods structure 1110. In one implementation, broadgoods 1110 is created by using a filament winding system, such as filament winding system 100, as described in FIG. 1. After the filament winding of a structure (such as mandrel 108 in FIG. 1), broadgoods 1110 may then be cut from the skin on the structure. In this implementation, an automated process is used to cut the broadgoods. Manual cutting may also be performed. These implementations are merely exemplary, and other implementations may also be used.

Following cutting of broadgoods 1110, the broadgoods may be placed on a complex mandrel to form the skin or other elements of the structure on the mandrel. In one implementation, broadgoods 1110 may be placed on the mandrel by an automated process. However, manual placement may also be performed. These implementations are merely exemplary, and other implementations may also be used.

Additionally, as shown in FIG. 11, broadgoods 1110 may be half overlapped wound to form interleaved broadgoods 1120. In one implementation, when a structure is filament wound, multiple layers of filament winding are applied. This form of filament winding may create windows between the layers. Half overlap winding of broadgoods creates interleaved broadgoods 1120, which is essentially a single layer. The formation of a single layer eliminates windows (openings between the crossing band of filaments) between the layers. The elimnation of windows aids in the prevention of moisture migrating through the laminate layers. Further, the creation of a single layer increases the shear properties of the material, which improves the damage tolerance of the material. This implementation is merely exemplary, and other implementations may also be used.

As shown in FIG. 11, interleaved broadgoods 1120 includes eight bands of broadgoods 1110, which may form a filament-wound skin. As shown in FIG. 11, each band of broadgoods 1110 is laid down such that each band overlaps an underlying band to form interleaved broadgoods 1120. After undergoing curing, interleaved broadgoods 1120 forms a single layer. In one implementation, each band is perpendicular to the underlying band. Other orientations may also be used. Indeed, these implementations are merely exemplary, and other implementations may also be used.

FIGS. 12A–15 describe step winding 1030, segment winding 1040, and space winding 1050 using enabling technology 1020, as shown in FIG. 10. Step winding 1030, segment winding 1040, and space winding 1050 are based on several winding paths. These winding paths are described in FIGS. 12A–12C. It should be noted that FIGS. 12–15 illustrate only the left to right winding steps of those implementations. The right to left winding steps are omitted for clarity.

Figure 12A:
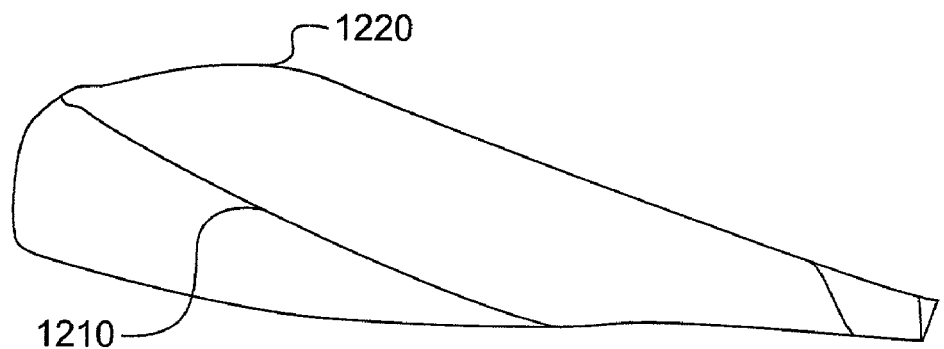
FIG. 12A illustrates geodesic winding of a filament on a mandrel in accordance with an embodiment of the invention.

FIG. 12A illustrates geodesic winding of a filament on a mandrel in accordance with an embodiment of the invention. As shown in FIG. 12A, geodesic winding is placement of filament 1210 on a mandrel 1220 such that filament 1210 takes the shortest path to achieve a desired number of turns around mandrel 1220. A geodesic filament path is a natural filament path for filament winding. In other words, the tension in filament 1210 and the shape of mandrel 1220 cause the filament path to be a geodesic filament path regardless of the desired filament path and planned filament winding placement. However, the filament path can be changed by altering the friction between mandrel 1220 and filament 1210.

In one implementation, as shown in FIG. 12A, filament 1210 makes two and three-fourths turns around mandrel 1220. In this implementation, the filament angle changes continuously as the filament is wound down the length of mandrel 1220 until the filament angle is almost perpendicular to the axis of rotation on the small end. This implementation is merely exemplary, and other implementations may also be used.

Figure 12B:
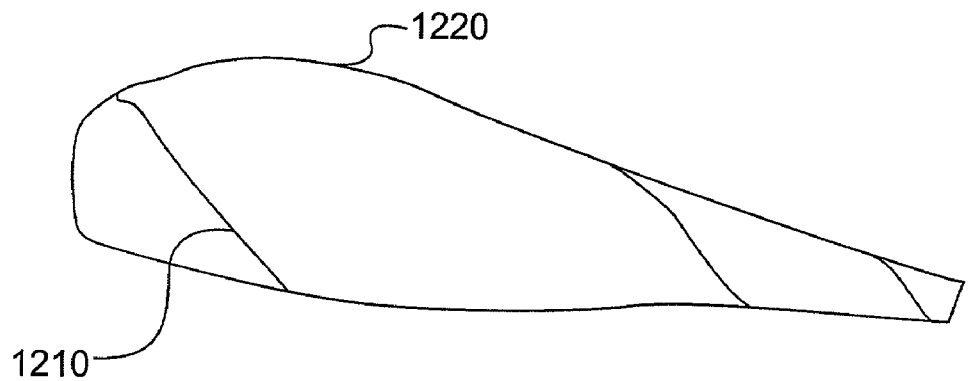
FIG. 12B illustrates non-geodesic winding of a filament on a mandrel in accordance with an embodiment of the invention.

FIG. 12B illustrates non-geodesic winding of a filament on a mandrel in accordance with an embodiment of the invention. As shown in FIG. 12B, non-geodesic winding is placement of filament 1210 on a mandrel 1220 such that filament 1210 takes a desired angle to achieve a desired number of turns around mandrel 1220. In one implementation, as shown in FIG. 12B, filament 1210 makes two and three-fourths turns around mandrel 1220 at a 45 degree angle. To maintain filament 1210 at this angle, filament 1210 must be adhered to the mandrel surface. Otherwise, as described above, filament 1210 will slip to a geodesic filament path. In one implementation, filament 1210 is adhered to the surface of mandrel 1220 using dressmaker pins. In another implementation, high tack resin is used to adhere filament 1210 to mandrel 1220. In this implementation, the resin tack keeps the filament in place until a return crossing filament locks it in place. These implementations are merely exemplary, and other implementations may also be used.

Figure 12C:
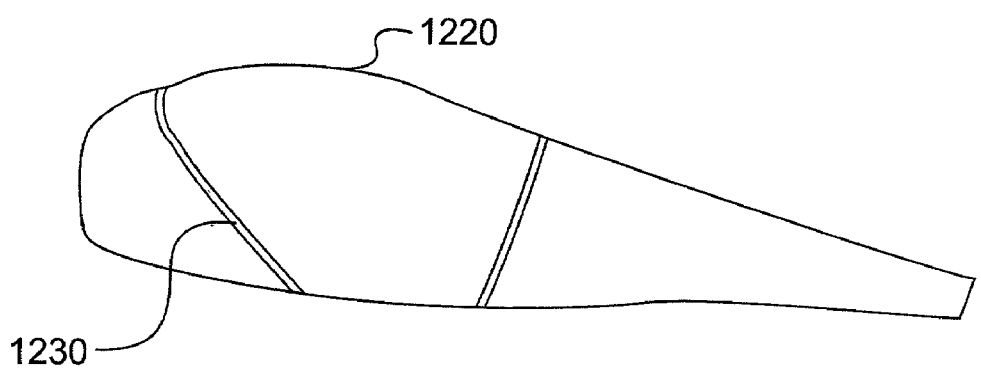
FIG. 12C illustrates non-geodesic natural path winding of a band of filaments on a mandrel in accordance with an embodiment of the invention.

FIG. 12C illustrates non-geodesic natural path winding of a band of filaments on a mandrel in accordance with an embodiment of the invention. As shown in FIG. 12C, similar to FIG. 12B, non-geodesic natural path winding includes placement of a band of filaments 1230 on a mandrel 1220 at a desired angle to achieve a desired number of turns around mandrel 1220. However, in non-geodesic natural path winding, following an initial rotation, no steps are taken to secure band of filament 1230 at the desired angle. Rather, band of filament 1230 is allowed to revert to the natural path of a flat band of filament on the surface of mandrel 1220.

In one implementation, as shown in FIG. 12C, the desired wind angle is 45 degrees. In this implementation, following the initial rotation, the natural path resulted in the path of band of filament 1230 changing direction and starting toward the large end of mandrel 1220. Although the natural path does not require an adherent, this process does not result in a desired filament wind angle and mandrel coverage for this shape. However, natural path filament orientation allows the use of a single high count filament bundle with wide filament bandwidth without one side or the other of the band being slack on the mandrel surface as all or most of the filaments in the bundle have even tension. This implementation is merely exemplary, and other implementations may also be used.

Figure 13:
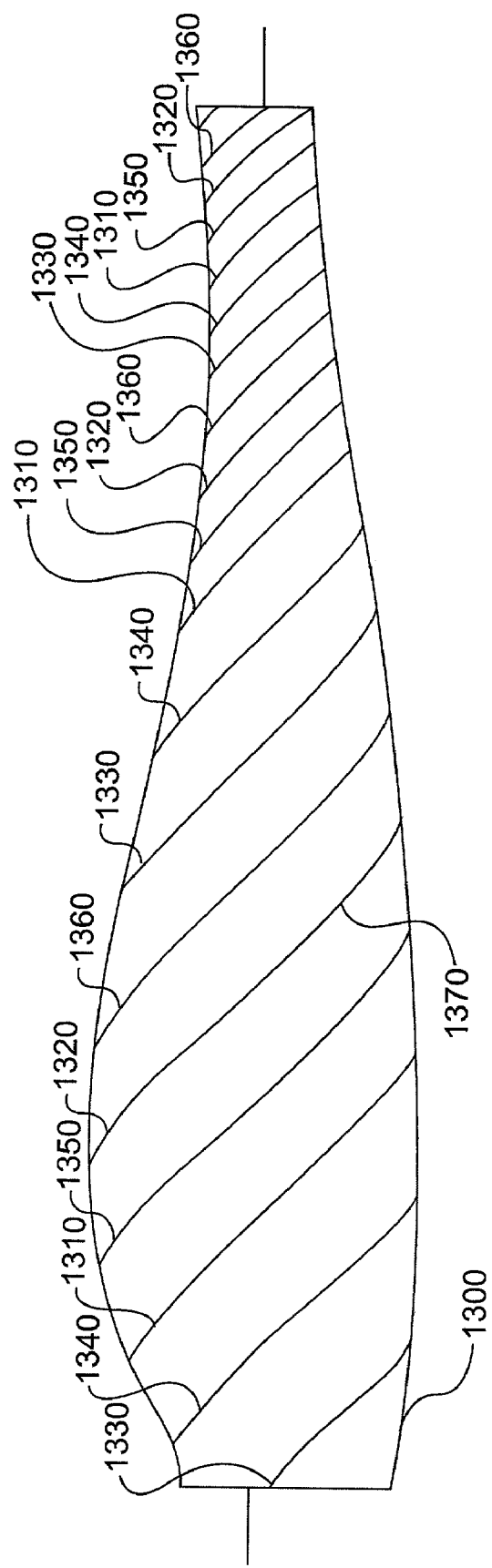
FIG. 13 illustrates step winding of a fiber bundle on a mandrel in accordance with an embodiment of the invention, as shown in FIG. 10.
Figure 14:
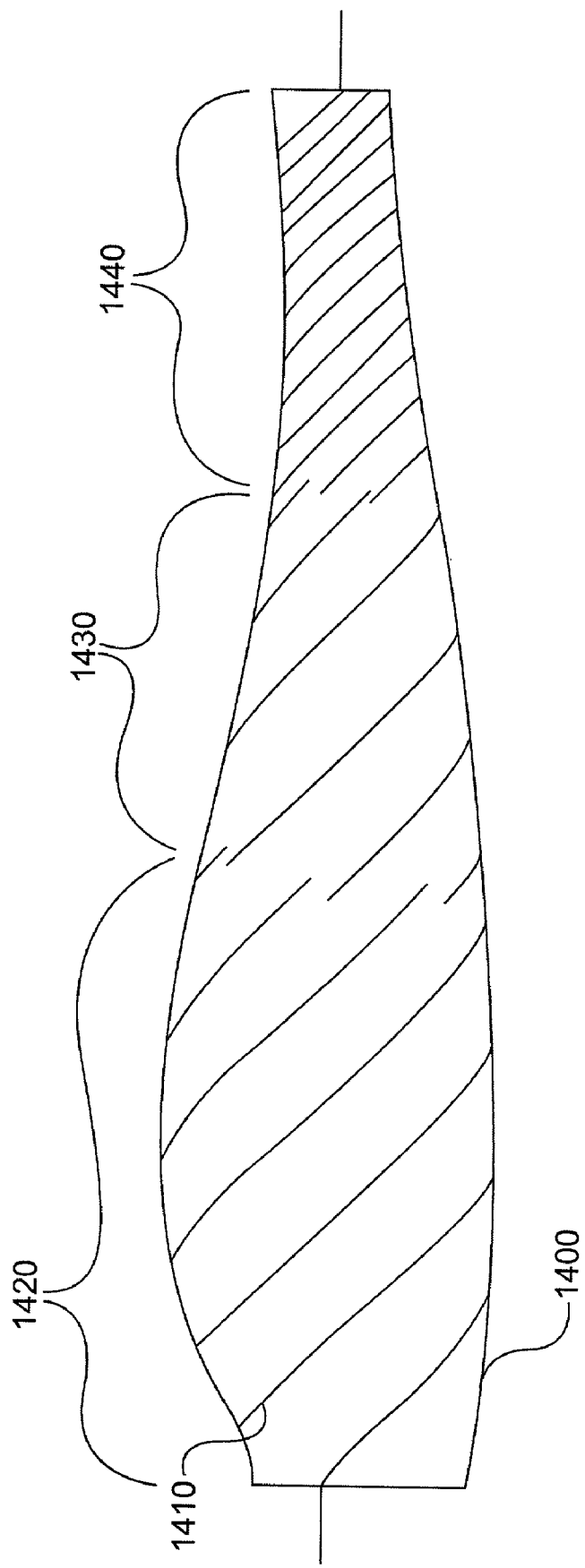
FIG. 14 illustrates segment winding of a fiber bundle on a mandrel in accordance with an embodiment of the invention, as shown in FIG. 10.
Figure 15:
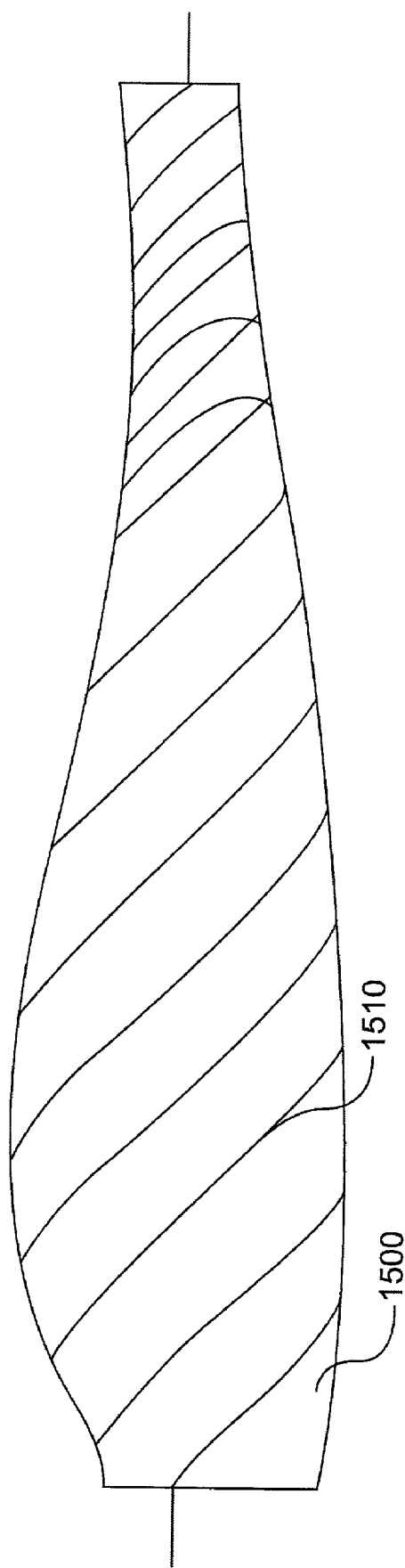
FIG. 15 illustrates space winding of a fiber bundle on a mandrel in accordance with an embodiment of the invention, as shown in FIG. 10.

FIGS. 12A–12C describe several basic filament winding paths. As stated above, step winding 1030, segment winding 1040, and space winding 1050 are based on these winding paths. FIGS. 13–15 describe step winding 1030, segment winding 1040, and space winding 1050 using enabling technology 1020, as shown in FIG. 10.

FIG. 13 illustrates step winding of a fiber bundle on a mandrel in accordance with an embodiment of the invention, as shown in FIG. 10. As shown in FIG. 13, step winding 1030 (of FIG. 10) includes the winding of filament 1370 on mandrel 1300 using a non-geodesic filament winding path, as described in FIG. 12B. FIG. 13 shows one implementation of six filament paths 1310, 1320, 1330, 1340, 1350, and 1360 for purposes of illustration. In an actual implementation, more than six filament paths would be wound on mandrel 1300. Filament paths 1310, 1320, 1330, 1340, 1350, and 1360 are representative of filament paths in step winding. For example, in this implementation, filament path 1310 is applied first from left to right. Filament 1370 would then be turned around and applied from right to left (not shown). Filament 1370 would then be turned around again and applied from left to right as filament path 1320. Filament path 1320 is followed by filament paths 1330, 1340, 1350, and 1360 respectively. In this implementation, a wind angle of 45 degrees is used. This implementation is merely exemplary, and other implementations may also be used.

As shown in FIG. 13, the filament bands become closer together as the filament is wound onto the smaller end of the mandrel 1300. Eventually, the smaller portion of mandrel 1300 will be covered while the larger end is only partially covered. The percentage covered is roughly equivalent to the ratio between the large end circumference and the small end circumference. In one implementation, after the smaller end of mandrel 1300 has been completely covered, the filament paths are turned around short of the small end. This implementation is merely exemplary, and other implementations may also be used.

In one implementation, the turning around of filament 1370 is accomplished short of the winding buildup on the small end of mandrel 1300 using winding aids called pin rings (not shown). Filament 1370 is locked onto mandrel 1300 at a discrete location along the length of mandrel 1300 using the pin rings during turn-around. In this implementation, the pin ring is shaped to fit mandrel 1300 at the desired location. The ring has multiple pins protruding from its surface, which capture filament 1370 when it crosses the pin ring. After crossing the pin ring, the winding path of filament 1370 is reversed back across the pin ring, where it is again captured and locked onto mandrel 1300. A cutting operation is subsequently performed to remove the pin rings and the excess filament to provide a substantially constant thickness. This implementation is merely exemplary, and other implementations may also be used.

FIG. 14 illustrates segment winding of a fiber bundle on a mandrel in accordance with an embodiment of the invention, as shown in FIG. 10. As shown in FIG. 14, segment winding (such as segment winding 1040 in FIG. 10) includes the winding of filament 1410 on mandrel 1400 using a non-geodesic filament winding path, as in FIG. 13. However, in segment winding, mandrel 1400 is divided into sections (or segments), and each segment is then wound separately. In one implementation, as shown in FIG. 14, mandrel 1400 is divided into three segments: forward segment 1420, mid segment 1430, and aft segment 1440. In this implementation, aft segment 1440 is wound first, and the forward turnaround area is removed. Mid segment 1430 is wound, and the forward turnaround area is removed. Finally, forward segment 1420 is wound, and the aft turnaround is removed after completion of the forward section. This implementation is merely exemplary, and other implementations (including any number of segments) may also be used. Using this winding methodology, the covering problem illustrated in FIG. 13 is eliminated because only the number of filament paths necessary to cover each segment of mandrel 1400 is used.

FIG. 15 illustrates space winding of a fiber bundle on a mandrel in accordance with an embodiment of the invention, as shown in FIG. 10. As shown in FIG. 15, space winding (such as space winding 1050 in FIG. 10) includes the winding of filament 1510 on mandrel 1500 using both a non-geodesic winding path and a non-geodesic natural winding path, as shown in FIGS. 12B–12C. In one implementation, space winding is similar to step winding, as shown in FIG. 13. However, after the smaller end of mandrel 1500 is covered, subsequent filament paths are turned around short of the aft end using a non-geodesic natural winding path. Therefore, completion of the wind pattern is accomplished by spacing out the turn around down the length of the mandrel to achieve an even thickness. This implementation is merely exemplary, and other implementations may also be used.

VI. CONCLUSION

As described above, therefore, other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents. In this context, equivalents mean each and every implementation for carrying out the functions recited in the claims, even if not explicitly described therein.

What is claimed is:

1. A filament winding apparatus for winding at least two fiber bundles onto a structure, comprising:
    a fiber bundle application section, wherein the fiber bundle application section further comprises:
        a spool section comprising at least two fiber bundle spools; and
        a winding head comprising at least two winding eyes to receive a fiber bundle from one of the at least two fiber bundle spools, wherein the at least two winding eyes are oriented such that each fiber bundle exits a winding eye in substantially the same plane as each other fiber bundle and at a specified distance from each other fiber bundle; and
        a spreading assembly, wherein the spreading assembly comprises at least two curved rods to spread each fiber bundle exiting each winding eye, wherein the winding eyes and curved rods are oriented such that as the fiber bundles spread, the distance between the fiber bundles decreases forming a substantially continuous band of fiber bundles;
    a transport to move the fiber bundle application section; and
    a controller for applying the substantially continuous band of fiber bundles on the structure.

2. The filament winding apparatus of claim 1, further comprising a mandrel supporting the structure.

3. The filament winding apparatus of claim 1, wherein the spool section further comprises:
    an idler rod to control the tension in at least one of the at least two fiber bundles.

4. The filament winding apparatus of claim 1, wherein the spool section further comprises:
    an articulator to rotate the spool section.

5. The filament winding apparatus of claim 1, wherein the fiber bundle application section further comprises:
    a winding head rotator to rotate the winding head.

6. The filament winding apparatus of claim 1, wherein the winding head further comprises:
    a roller to apply the substantially continuous band of fiber bundles on the structure.

7. The filament winding apparatus of claim 1, wherein at least one of the rods rotates.

8. The filament winding apparatus of claim 1, further comprising a resin applicator to apply resin to the at least two fiber bundles.

9. The filament winding apparatus of claim 8, wherein the resin applicator further comprises:
    a resin container;
    a resin hose connected to the resin container; and
    a resin dispenser.

10. The filament winding apparatus of claim 9, wherein the resin container is heated.

11. The filament winding apparatus of claim 9, wherein the resin applicator further comprises a resin metering drum to instruct the resin container to provide a measured quantity of the resin to the resin dispenser.

12. The filament winding apparatus of claim 1, wherein the controller moves the transport to apply the substantially continuous band of fiber bundles on the structure in a predetermined location.

13. The filament winding apparatus of claim 2, wherein the controller moves the transport and rotates the mandrel to apply the substantially continuous band of fiber bundles on the structure in a predetermined location.

14. The filament winding apparatus of claim 4, wherein the controller moves the transport and operates the articulator to apply the substantially continuous band of fiber bundles on the structure in a predetermined location.

15. The filament winding apparatus of claim 5, wherein the controller moves the transport and operates the winding head rotator to apply the substantially continuous band of fiber bundles on the structure in a predetermined location.

16. The filament winding apparatus of claim 1, wherein the structure is a fuselage for an aircraft.

17. The filament winding apparatus of claim 1, wherein the fiber bundle has a gauge tow of less than 0.0038 inches.

18. A filament winding apparatus for winding at least two fiber bundles onto a structure, wherein the structure is supported by a mandrel, comprising:
    a fiber bundle application section, wherein the fiber bundle application section further comprises:
        a spool section, wherein the spool section further comprises:
            at least two fiber bundle spools; and
            at least two idler rods to control the tension in each of the at least two fiber bundles;
        an articulator to rotate the spool section; and
        a winding head comprising at least two winding eyes to receive a fiber bundle from one of the at least two fiber bundle spools, wherein the at least two winding eyes are oriented such that each fiber bundle exits a winding eye in substantially the same plane as each other fiber bundle and at a specified distance from each other fiber bundle; and
        a spreading assembly, wherein the spreading assembly comprises at least two curved rods to spread each fiber bundle exiting each winding eye, wherein the winding eyes and curved rods are oriented such that as the fiber bundles spread, the distance between the fiber bundles decreases forming a substantially continuous band of fiber bundles;
    a resin applicator to apply resin to the at least two fiber bundles;
    a transport to move the fiber bundle application section; and a controller for applying the substantially continuous band of fiber bundles on the structure.

19. The filament winding apparatus of claim 18, wherein the fiber bundle application section further comprises:
a winding head rotator to rotate the winding head.

20. The filament winding apparatus of claim 19, wherein the winding head further comprises:
a roller to apply the substantially continuous band of fiber bundles on the structure.

21. The filament winding apparatus of claim 18, wherein at least one of the rods rotates.

22. The filament winding apparatus of claim 18, wherein the resin applicator further comprises:
a resin container;
a resin hose connected to the resin container; and
a resin dispenser.

23. The filament winding apparatus of claim 22, wherein the resin container is heated.

24. The filament winding apparatus of claim 22, wherein the resin applicator further comprises a resin metering drum to instruct the resin container to provide a measured quantity of the resin to the resin dispenser.

25. The filament winding apparatus of claim 18, wherein the controller moves the transport, rotates the mandrel, operates the articulator, and operates the winding head rotator to apply the substantially continuous band of fiber bundles on the structure in a predetermined location.

26. The filament winding apparatus of claim 18, wherein the structure is a fuselage for an aircraft.

27. The filament winding apparatus of claim 18, wherein the fiber bundle has a gauge tow of less than 0.0038 inches.

28. A system for filament winding a closed-shape structure, comprising:
a first providing component configured to provide a mandrel on which a fiber bundle can be wound;
a second providing component configured to provide at least two spools of fiber bundles for a winding assembly configured to travel along a path substantially parallel to the axis of rotation of the mandrel;
a feeding component comprising at least two winding eyes configured to feed each fiber bundle from the spool through one of the at least two winding eyes, wherein the at least two winding eyes are oriented such that each fiber bundle exits a winding eye in substantially the same plane as each other fiber bundle and at a specified distance from each other fiber bundle;
a conveying component configured to convey each fiber bundle through a rod assembly to spread each fiber bundle to a desired thickness, wherein the rod assembly comprises at least two curved rods to spread each fiber bundle and wherein the winding eyes and curved rods are oriented such that as the fiber bundles spread, the distance between the fiber bundles decreases forming a substantially continuous band of fiber bundles; and
a first applying component configured to apply the substantially continuous band of fiber bundles to the mandrel.

29. The system of claim 28, further comprising: a second applying component configured to apply resin to the at least two fiber bundles in an area within the rod assembly.

30. The system of claim 28, wherein the first applying component is configured to apply the substantially continuous band of fiber bundles to the mandrel in a manner that provides a substantially uniform skin thickness.

31. The system of claim 28, wherein the first applying component is further configured to apply the substantially continuous band of fiber bundles in a non-geodesic winding path.

32. The system of claim 28, wherein the first applying component is further configured to divide the mandrel into at least two sections; and apply the substantially continuous band of fiber bundles in a non-geodesic winding path within each section.

33. The system of claim 28, wherein the first applying component is further configured to apply the substantially continuous band of fiber bundles in a non-geodesic winding path on a portion of the mandrel and to apply the substantially continuous band of fiber bundles in a non-geodesic natural winding path on the remaining portion of the mandrel.

34. The system of claim 28, wherein the mandrel is a fuselage for an aircraft.

35. The system of claim 28, wherein the substantially continuous band of fiber bundle has a gauge tow of less than 0.0038 inches.

36. A system for filament winding a closed-shape structure, comprising:
first providing means for providing a mandrel on which at least two fiber bundles can be wound;
second providing means for providing at least two spools of a fiber bundle for a winding assembly configured to travel along a path substantially parallel to the axis of rotation of the mandrel;
a feeding means comprising at least two winding eyes for feeding each fiber bundle from the spool through one of the at least two winding eyes wherein the at least two winding eyes are oriented such that each fiber bundle exits a winding eye in substantially the same plane as each other fiber bundle and at a specified distance from each other fiber bundle;
a conveying means for conveying each fiber bundle through a rod assembly to spread each fiber bundle to a desired thickness, wherein the rod assembly comprises at least two curved rods to spread each fiber bundle and wherein the winding eyes and curved rods are oriented such that as the fiber bundles spread, the distance between the fiber bundles decreases forming a substantially continuous band of fiber bundles; and
an applying means for applying the substantially continuous band of fiber bundles to the mandrel.

37. The filament winding apparatus of claim 1, wherein the winding eyes include ceramic inserts.

38. The filament winding apparatus of claim 1, wherein the spreading assembly further comprises a non-curved rod and wherein the winding eyes, curved rods, and non-curved rod are oriented such that as the fiber bundles spread, the distance between the fiber bundles decreases forming a substantially continuous band of fiber bundles.

* * * * *